(12) United States Patent
Taya et al.

(10) Patent No.: US 10,838,279 B2
(45) Date of Patent: *Nov. 17, 2020

(54) HEAT-RESISTANT ELECTROLYTE MATERIALS AND ELECTROCHROMIC DEVICES INCLUDING THEM

(71) Applicant: University of Washington, Seattle, WA (US)

(72) Inventors: Minoru Taya, Mercer Island, WA (US); Nishita Anandan, Seattle, WA (US)

(73) Assignee: University of Washington, Seattle, WA (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/943,030

(22) Filed: Apr. 2, 2018

(65) Prior Publication Data

US 2018/0284554 A1  Oct. 4, 2018

Related U.S. Application Data

(63) Continuation of application No. 14/693,642, filed on Apr. 22, 2015, now Pat. No. 9,933,680.

(Continued)

(51) Int. Cl.
*G02F 1/15* (2019.01)
*G02F 1/1523* (2019.01)
(Continued)

(52) U.S. Cl.
CPC .......... *G02F 1/1525* (2013.01); *G02F 1/0018* (2013.01); *G02F 1/15* (2013.01);
(Continued)

(58) Field of Classification Search
CPC ........ G02F 1/155; G02F 1/163; G02F 1/1533; G02F 1/153; G02F 1/157; G02F 1/1523;
(Continued)

(56) References Cited

U.S. PATENT DOCUMENTS 5,028,124 A * 7/1991 Akhtar .................. G02F 1/1525
359/265
5,734,323 A 3/1998 Hermes et al.
(Continued)

FOREIGN PATENT DOCUMENTS

WO  2005084350 A2  9/2005
WO  2006029344 A2  3/2006

OTHER PUBLICATIONS 2,2-Bis(hydroxymethyl)propionic acid 98%—Sigma-Aldrich (n.d.), http://www.sigmaaldrich.com/catalog/product/aldrich/106615?lang-en®ion=US, retrieved Jun. 12, 2014.
(Continued)

*Primary Examiner* — Evelyn A Lester
(74) *Attorney, Agent, or Firm* — McDonnell Boehnen Hulbert & Berghoff LLP

(57) ABSTRACT

The present disclosure relates to relates to heat-resistant gel electrolyte materials and their uses, for example, in electrochromic devices such as electrochromic windows. In certain embodiments, the disclosure provides an electrolyte material including a polymer of ethyleneimine, optionally at least partially crosslinked (e.g., with an epoxide crosslinker such as the diglycidyl ether of bisphenol A); a lithium salt (e.g., lithium perchlorate); and a high-boiling solvent (e.g., DMSO). The electrolyte materials can be used in electrochromic devices, such as electrochromic windows, e.g., for use as automobile sunroofs

19 Claims, 11 Drawing Sheets

Related U.S. Application Data

(60) Provisional application No. 61/985,296, filed on Apr. 28, 2014.

(51) Int. Cl.

| | |
|---|---|
| G02F 1/155 | (2006.01) |
| G02F 1/163 | (2006.01) |
| G02F 1/00 | (2006.01) |
| G02F 1/161 | (2006.01) |
| G02F 1/153 | (2006.01) |
| G02F 1/157 | (2006.01) |
| G02F 1/1516 | (2019.01) |
| G02F 1/1514 | (2019.01) |

(52) U.S. Cl.
CPC .............. *G02F 1/153* (2013.01); *G02F 1/155* (2013.01); *G02F 1/157* (2013.01); *G02F 1/1523* (2013.01); *G02F 1/1533* (2013.01); *G02F 1/15165* (2019.01); *G02F 1/161* (2013.01); *G02F 1/163* (2013.01); *G02F 2001/1555* (2013.01); *G02F 2001/15145* (2019.01); *G02F 2201/44* (2013.01)

(58) Field of Classification Search
CPC .... G02F 1/161; G02F 1/15; G02F 2001/1515; G02F 2001/1555; G02F 1/0018; G02F 1/1521; G02F 2001/1512; G02F 2201/44; H01M 2008/1095; H01M 8/1246
USPC .......... 205/414; 429/67, 126, 422, 475, 477, 429/482, 491; 359/265–275
See application file for complete search history.

(56) References Cited

U.S. PATENT DOCUMENTS

| | | | |
|---|---|---|---|
| 5,753,388 | A | 5/1998 | Koksbang et al. |
| 6,094,292 | A | 7/2000 | Goldner et al. |
| 9,933,680 | B2 * | 4/2018 | Taya ..................... G02F 1/1525 |
| 2002/0196518 | A1 | 12/2002 | Xu et al. |
| 2004/0143091 | A1 | 7/2004 | Xu et al. |
| 2007/0188845 | A1 | 8/2007 | Xu et al. |
| 2009/0067030 | A1 | 3/2009 | Liu et al. |
| 2010/0324306 | A1 | 12/2010 | Liu et al. |

OTHER PUBLICATIONS

Amasawa, et al., "Design and characterization of a durable and highly efficient energy-harvesting electrochromic window," retrieved from https://digital.lib.washington.edu:443/xmlui/handle/1773/25168, 2013.
Amb, et al., "Navigating the color palette of solution-processable electrochromic polymers," Chemistry of Materials, vol. 23, No. 3, pp. 397-415, 2011.
Anandan, "Heat resistant polymer electrolyte for enhanced organic electrochromic windows based on poly (3,3-dimethyl-3,4-dihydro-2H-thieno[3,4-b][1,4]dioxepine)," Master's Thesis, University of Washington: Seattle, 110 pages, 2014.
Arasteh, et al., "Zero Energy Windows," Lawrence Berkeley Natl. Lab., 2006.
Bernhard, et al., "Iron(II) and copper(I) coordination polymers: electrochromic materials with and without chiroptical properties," Inorganic Chemistry, vol. 42, No. 14, pp. 4389-4393, 2003.
Bisphenol A diglycidyl ether—Sigma-Aldrich (n.d.), http://www.sigmaaldrich.com/catalog/product/sigma/d3415?lang=en&region=US, retrieved Jun. 12, 2014.
Campet, et al., "PLR (Plastic Lithium Rechargeable) Batteries using Nanoscale Materials: A Convenient Source of Electrical Energy for the Future?" Bulletin of the Korean Chemical Society, 20(8):885-892, 1999.
Carmody, et al., Window Systems for High-Performance Buildings, Norton: New York, pp. 93-101, 2015.
Chang, et al., "Tungstun oxide nanowires grown on graphene oxide sheets as high performance electrochromic material," Electrochimica Acta, vol. 129, No. 1, pp. 40-46, 2014.
Chiang, et al., "Polymeric electrolyte based on poly(ethylene imine) and lithium salts," Solid State Ionics, vol. 18-19, Pt 1, pp. 300-305, 1986.
Choi, et al., "High Contrast Ratio and Rapid Switching Organic Polymeric Electrochromic Thin Films Based on Triarylamine Derivatives from Layer-by-Layer Assembly," Chemistry of Materials, vol. 18, No. 25, pp. 5823-5825, 2006.
Cogan, et al., "Optical properties of electrochromic vanadium pentaoxide," Journal of Applied Physics, vol. 66, No. 3, pp. 1333-1337, 1989.
Compton, et al. "Electron paramagnetic resonance spectroscopy of electrodeposited species from solutions of 1,1'-bis-(p-cyanophenyl)-4,4'-bipyridilium (cyanophenyl paraquat, CPQ)," Journal of the Chemical Society, Faraday Transactions, vol. 86, No. 14, pp. 2583-2586, 1990.
Constable, "The Coordination Chemistry of 2,2':6',2''-Terphyridine and Higher Oligopyridines," Advances in Inorganic Chemistry, vol. 30, pp. 69-121, 1986.
Coordinate Covalent Bonding—EasyChem—The Ultimate Resource for HSC Chemistry: Syllabus-Based Dot-Point Study Notes/Summaries, Past Exam Papers, and More (n.d.), http://www.easychem.com.au/monitoring-and-management/the-atmosphere/coordinate-covalent-bonding, retrieved Jun. 2, 2014.
DeLongchamp, et al., "High-contrast electrochromism and controllable dissolution of assembled Prussian blue/polymer nanocomposites," Advanced Functional Materials, vol. 14, No. 3, pp. 224-232, 2004.
Dkhissi, et al., "Theoretical investigation of the nature of the ground state in the low-bandgap conjugated polymer, poly(3,4-ethylenedioxythiophene)," Chemical Physics Letters, vol. 359, No. 5-6, pp. 466-472, 2002.
Faughnan, et al., "Electrochromism in WO3 amorphous films," RCA Review, vol. 36, pp. 177-197, 1975.
Friese, et al, "From coordination complexes to coordination polymers through self-assembly," Current Opinion in Colloid & Interface Science, vol. 14, No. 2, pp. 81-93, 2009.
Funt, et al., "Electroinitiated Polymerization of Styrene: II. Kinetics in Solutions of Tetramethylammonium Salts," Canadian Journal of Chemistry, vol. 42, No. 12, pp. 2733-2738, 1964.
Geim, "Graphene: Status and Prospects," Science, vol. 324, No. 5934, pp. 1530-1534, 2009.
Greenhouse Effect: Background Material (n.d.), http://www.ucar.edu/learn/1_3_1.htm, retrieved Jun. 11, 2014.
Han, et al., "Metallo-Supramolecular Polymers Based on Functionalized Bis-terpyridines as Novel Electrochromic Materials," Advanced Materials, vol. 19, No. 22, pp. 3928-3931, 2007.
Higuchi, "Electrochromic Organic-Metallic Hybrid Polymers: Fundamentals and Device Applications," Polymer Journal, vol. 41, No. 7, 511-520, 2006.
Ionescu-vasii, et al., "Conductivities of electrolytes based on PEI-b-PEO-b-PEI triblock copolymers with lithium and copper TFSI salts," Solid State Ionics, vol. 177, No. 9-10, pp. 885-892, 2006.
Ionescu-vasii, et al., "Synthesis and characterization of new block copolymer electrolytes with solvating affinities for different cations," Solid State Ionics, vol. 176, No. 37-38, pp. 2769-2775, 2005.
Kaiser, et al., "Electrical conduction mechanism in chemically derived graphene monolayers," Nano Letters, vol. 9, No. 5, pp. 1787-1792, 2009.
Kim, et al., "Electropolymerization kinetic study of 3,3-dimethyl-3,4-dihydro-2H-thieno[3,4-b][1,4] dioxepine and its optical optimization for electrochromic window applications," Electrochimica Acta, vol. 55, No. 19, pp. 5307-5311, 2010.
Kurth et al., "Metallo-supramolecular polyelectrolyte multilayers with cobalt (II): preparation and properties," Colloids and Surfaces A: Physicochemical and Engineering Aspects, 198-200:633-643, 2002.
Li, et al., "Highly contrasted and stable electrochromic device based on well-matched viologen and triphenylamine," Organic Electronics, vol. 15, No. 2, pp. 428-434, 2014.

(56) References Cited

OTHER PUBLICATIONS

Li, et al., "Substituent Effects on Metallo-Supramolecular Coordination Polymers," J. Inorg. Organomet. Polym. Mater., vol. 20, No. 1, pp. 1018, 2010.

Liang, et al., "Co3O4 nanocrystals on graphene as a synergistic catalyst for oxygen reduction reaction," Nature Materials, vol. 10, pp. 780-786, 2011.

Mastragostino, et al., "Polymer-based electrochromic devices—I. Poly(3-methylthiophenes)," Electrochimica Acta, vol. 38, No. 1, pp. 135-140, 1993.

Mortimer, "Electrochromic materials," Chemical Society Reviews, vol. 26, No. 3, pp. 147-156, 1997.

Mortimer, "Organic electrochromic materials," Electrochimica Acta, vol. 44, No. 18, pp. 2971-2981, 1999.

Mortimer, et al., "Electrochromic organic and polymeric materials for display applications," Displays, vol. 27, No. 1, pp. 2-18, 2006.

On the Heating of Parked Cars—Doing Science to Stuff on WordPress.com (n.d.), http://blog.doingsciencetostuff.com/2013/07/18/on-the-heating-of-parked-cars, retrieved May 22, 2014.

Poly(ethylene glycol) average mol wt 200—Sigma-Aldrich (n.d.), http://www.sigmaaldrich.com/catalog/product/sial/p3015?lang=en&region=US, retrieved Jun. 2, 2014.

Poly(ethylene glycol) methyl ether methacrylate average Mn 500, contains 100 ppm MEHQ as inhibitor, 200 ppm BHT as inhibitor—Sigma-Aldrich (n.d.), http://www.sigmaaldrich.com/catalog/product/aldrich/447943?lang=en&region=US, retrieved Jun. 2, 2014.

Polyethylenimine, branched average Mw 25,000 by LS, average Mn 10,000 by GPC, branched—Sigma-Aldrich (n.d.), http://www.sigmaaldrich.com/catalog/product/aldrich/408727?lang=en&region=US, retrieved Jun. 12, 2014.

Roncali, "Conjugated poly(thiophenes): synthesis, functionalization, and applications," Chemical Reviews, vol. 92, No. 4, pp. 711-738, 1992.

Rourke, et al., "Cyclic voltammetry and morphology of polyaniline-coated electrodes containing [Fe(CN)6]3-/4-ions," Journal of the Chemical Society, Faraday Transactions, vol. 89, No. 2, pp. 295-302, 1993.

Salmaoui, et al., "Hexagonal hydrated tungsten oxide nanomaterials: Hydrothermal synthesis and electrochemical properties," Electrochimica Acta, vol. 108, No. 1, pp. 634-643, 2013.

Shriver, et al., "Structure and ion transport in polymer-salt complexes," Solid State Ionics, vol. 5, pp. 83-88, 1981.

Snow, et al., "Synthesis and spectroscopic studies of linear poly(N-(2-(2-methoxyethoxy)ethyl)ethylenimine), a PEI/PEO hybrid, and its interactions with lithium triflate," Electrochimica Acta, vol. 48, No. 14-16, pp. 2065-2069, 2003.

Somani, et al., "Electrochromic materials and devices: present and future," Materials Chemistry and Physics, vol. 77, No. 1, pp. 117-133, 2003.

Song, "Review of gel-type polymer electrolytes for lithium-ion batteries," Journal of Power Sources, vol. 77, No. 2, pp. 183-197, 1999.

Takahashi, et al., "Synthesis and Electrochemical Properties of Single-Crystal V2O5 Nanorod Arrays by Template-Based Electrodeposition," Journal of Physical Chemistry B, vol. 108, No. 28, pp. 9795-9800, 2004.

The Polyene Series—CMDITRWIKI (n.d.), http://photonicswiki.org/index.php?title=Thepolyeneseries, retrieved May 28, 2014.

Unal, et al., "Influence of DGEBA crosslinking on Li+ ion conduction in poly(ethyleneimine) gels," Polymer, vol. 48, No. 20, pp. 6077-6085, 2007.

Wang, et al., "Controlled synthesis of WO3 nanorods and their electrochromic properties in H2SO4 electrolyte," Journal of Physical Chemistry C, vol. 113, No. 22, pp. 9655-9658, 2009.

Wang, et al., "Mn3O4-graphene hybrid as a high-capacity anode material for lithium ion batteries," Journal of the American Chemical Society, vol. 132, No. 40, pp. 13978-13980, 2010.

Wang, et al., "Solvothermal reduction of chemically exfoliated graphene sheets," Journal of the American Chemical Society, vol. 131, No. 29, pp. 9910-9911, 2009.

Wang, et al., Synthesis and characterization of electrochromic plate-like tungsten oxide films by acidic treatment of electrochemical anodized tungsten, Electrochimica Acta, vol. 112, No. 1, pp. 24-31, 2013.

World Business Council for Sustainable Development, "Energy Performance in Buildings: Transforming the Market," IS 2009-65, 2009.

Xiang, et al., "Graphene-based semiconductor photocatalysts," Chemical Society Reviews, vol. 41, No. 2, pp. 782-796, 2012.

Xu, et al., "Electrochemical copolymerization of indole and 3,4-ethylenedioxythiophene," Journal of Materials Science, 40(11):2867-2873, 2005.

Yan, et al., "Hierarchical assemblies of coordination supramolecules," Coordination Chemistry Reviews, vol. 254, No. 9-10, pp. 1072-1080, 2010.

Yan, et al., "Rapid microwave-assisted synthesis of graphene nanosheet/Co3O4 composite for supercapacitors," Electrochimica Acta, vol. 55, No. 23, pp. 6973-6978, 2010.

Zhang et al., "Hydrothermally synthesized WO3 nanowire arrays with highly improved electrochromic performance," Journal of Materials Chemistry, vol. 21, No. 14, pp. 5492-5498, 2011.

Zhu, et al., "Carbon-based supercapacitors produced by activation of graphene," Science, vol. 332, No. 6037, pp. 1537-1541, 2011.

Zhu, et al., "Graphene and graphene oxide: synthesis, properties, and applications," Advanced Materials, vol. 22, No. 35, pp. 3906-3924, 2010.

* cited by examiner neutral ⇌ oxidized

HEAT-RESISTANT ELECTROLYTE MATERIALS AND ELECTROCHROMIC DEVICES INCLUDING THEM

CROSS-REFERENCE TO RELATED APPLICATIONS

This application is a continuation of U.S. application Ser. No. 14/693642 filed Apr. 22, 2015 now U.S. Pat. No. 9933680 issued Apr. 3, 2018, which claims the benefit of priority of U.S. Provisional Patent Application No. 61/985,296, filed Apr. 28, 2014, which is hereby incorporated herein by reference in its entirety.

STATEMENT OF GOVERNMENT SUPPORT

This invention was made with government support under contract no. NSF-EFRI 1038165, awarded by the National Science Foundation. The government has certain rights in the invention.

BACKGROUND OF THE DISCLOSURE

1. Field of the Disclosure

The present disclosure relates generally to gel electrolyte materials. More particularly, the present disclosure relates to heat-resistant gel electrolyte materials and their uses, for example, in electrochromic devices such as electrochromic windows.

2. Technical Background

An electrochromic window (ECW) is a device that changes its optical properties in a reversible and persistent way (e.g., between substantially transparent and a less transparent state) upon the input of a voltage pulse. ECWs have significant potential to reduce energy use in buildings. Buildings account for roughly 40% of the world's energy use, with the resulting carbon emissions being substantially more than those from the transportation sector. In the United States, the energy lost through today's relatively inefficient window stock accounts for about 30% of building heating and cooling energy. ECWs can be a significant factor in reducing building energy use and ultimately in achieving net zero energy buildings. Dynamic windows are key to achieving this goal while preserving the view and enhancing the comfort and productivity of building occupants.

There are several possible configurations for ECWs; one practical one is shown in FIG. 1. The ECW of FIG. 1 includes a stack of seven layers. The outermost layer on each side is glass, on which a transparent conductive oxide film is coated. The conductive layer is desirably substantially transparent. On one of the conductive oxides is coated an electrochromic material; on the other, a counterelectrode material (an "ion storage film") is coated. Between the electrochromic layer and the counterelectrode material are sandwiched an electrolyte material. The counterelectrode material is capable of electrochemically reversibly absorbing lithium ions from the electrolyte and releasing lithium ions into the electrolyte The assembled stack is sealed with an appropriate adhesive and tested for optical performance. The electrochromic material typically has mixed conductivity for both electrons and ions; if ions are introduced from electrolyte or from an adjacent ion conductor there is a corresponding charge-balancing counterflow of electrons from the transparent electron conductor. The electrons remain in the electrochromic material as long as the ions reside there and, the electrons will then evoke persistent change of the optical properties. Depending on the nature of the electrochromic material, the injected electron may increase or decrease transparency. The electrolyte can take many forms, for example, a thin film or a bulk material like a solid inorganic or organic polymeric material. The ion storage material provides cyclic stability to the ECW by maintaining ions for the next cycle. Like the electrochromic material, the counterelectrode (or "ion storage") material typically has high ionic and electronic conductivity. The counterelectrode material may or may not have electrochromic properties. When a voltage is applied between the transparent conductors as indicated by FIG. 1, a distributed electrical field is set up and ions move into or out of the electrochromic material, causing a change in its optical properties (e.g., transparency). The charge-balancing counterflow of electrons through the external circuit then leads to a variation of electron density in the electrochromic material thereby result in modulation of their optical properties. If the electrolyte has negligible electronic conductivity, the device will exhibit open circuit memory, so that the optical properties remain stable over periods of time. The applied voltage to the ECW is desirably on the order of only a few volts, as higher voltages may lead to deterioration of the device.

In applications where relatively low weight, thickness and power consumption are desired, organic materials that can be precisely printed, sprayed, spin coated, stamped, drop-casted into predetermined patterns offer a competitive alternative to their inorganic counterparts. Many organic materials exhibit redox states with distinct electronic (UV/visible) absorption spectra. Where the switching of redox states generates new or different absorption bands in the visible region, the material is said to be electrochromic]. Color changes are commonly between a transparent ('bleached') state, where the chromophore substantially absorbs only in the UV region and a colored state; or between two differently-colored states. Where more than two redox states are electrochemically accessible in a given electrolyte solution, the electrochromic material may exhibit several colors and be termed poly-electrochromic.

Organic electrochromic materials are of three basic types. In Type I materials, the electrochromic material is soluble in both the reduced and oxidized state in a given electrolyte material. For example, 1,1-di-methyl-4,4-bipyridilium (methyl viologen) dissolves in both oxidized and reduced states. For such materials, soluble electrochemically-generated product material diffuses away and the current flow must be maintained until the whole solution becomes electrolyzed to maintain its optical properties in a given state. In Type II materials, only one of the reduced or oxidized states is soluble, for example 1,1-di-heptyl-4,4-bipyridilium(heptyl viologen). In Type III materials, such as conductive polymers, both redox states are solids; such systems are studied and used, for example, as solid thin films on substrates. Type II and III materials can have optical memory, which means that once the redox state has been switched, no further charge injection is needed to retain the new electrochromic state.

The electrolyte material is often in the form of a gel. Conventional gel electrolytes include an alkali metal salt in a polymer host (often swollen with a solvent to provide the gel properties). Electrolytes for ECWs should be highly ionically conductive but relatively electrically insulating. High ionic conductivity ensures the movement of cations and anions in the electrolyte, but if the electrolyte is electrically conductive it can short-circuit the ECW. Transmittance is another important criterion to be taken in the selection of an electrolyte material for an ECW. The electrolyte should maintain high transparency and ionic conductivity over a range of temperatures.

Accordingly, what is needed are electrolyte materials that can provide desirable heat resistance as well as desirable levels of ion conductivity, electrical insulation and transmittance.

SUMMARY OF THE DISCLOSURE

In one aspect, the present disclosure provides an electrolyte material comprising:
- a polymer of ethyleneimine, optionally at least partially crosslinked (e.g., with an epoxide crosslinker such as the diglycidyl ether of bisphenol A);
- a lithium salt (e.g., lithium perchlorate); and
- a high-boiling solvent (e.g., DMSO).

In another aspect, the present disclosure provides an electrochromic device comprising
- an electrochromic material;
- a counterelectrode; and
- an electrolyte material as described herein, disposed between the electrochromic material and the counterelectrode, the counterelectrode being capable of electrochemically reversibly absorbing lithium ions from the electrolyte and releasing lithium ions into the electrolyte.

Additional aspects and embodiments will be evident to the person of ordinary skill in the art in view of the present disclosure.

DETAILED DESCRIPTION

Figure 1:
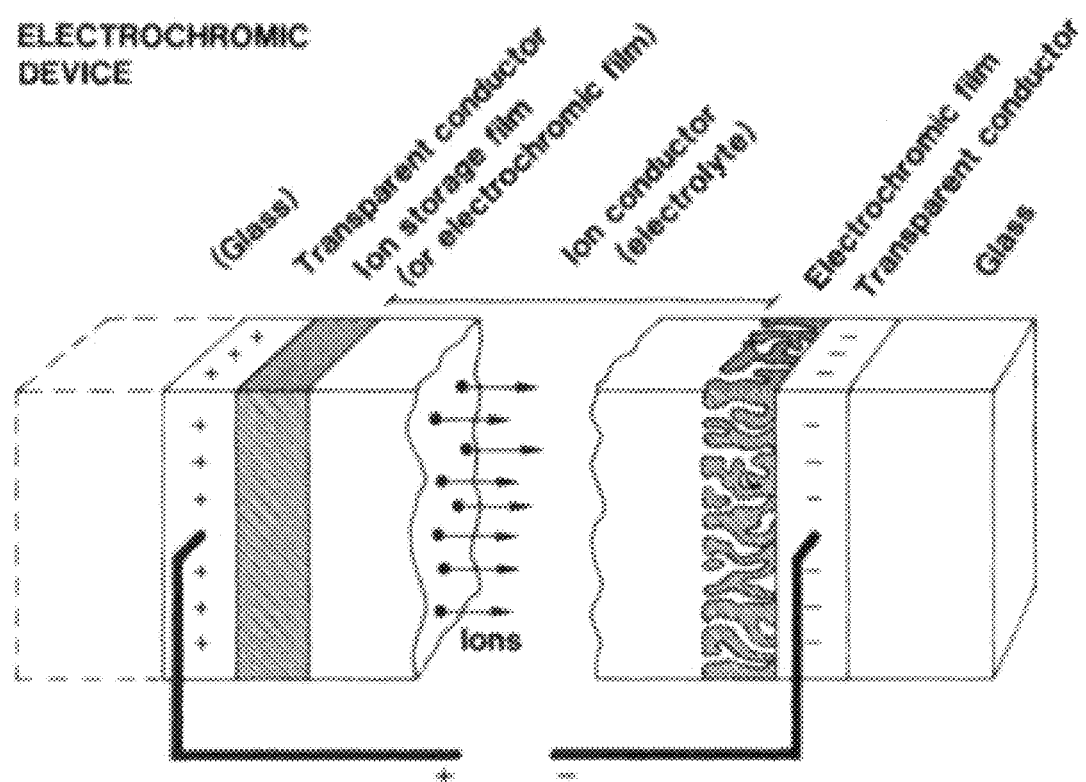
FIG. 1 is a schematic partial view of a conventional electrochromic window.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Definitions and explanations used in the present disclosure are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment. As used herein, a material effect would result in a statistically significant reduction in the effectiveness of a compound in treating cancer, a parasitic infection or a yeast infection.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

In various aspects and embodiments, the disclosure relates to electrolyte materials useful for electrochromic devices such as electrochromic windows. One embodiment of the disclosure is an electrolyte material. The electrolyte material includes a polymer of ethyleneimine, optionally crosslinked (e.g., with a polyfunctional epoxide crosslinker such as bisphenol A diglycidyl ether; a lithium salt (e.g., lithium perchlorate); and a high-boiling solvent (e.g., dimethylsulfoxide (DMSO)).

Oxygen containing polymers such as poly(ethylene oxide), poly(propylene oxide) and poly(ethylene succinate) can interact with lithium cations through unshared electron pairs of oxygen. Use of a polymer of ethyleneimine can be advantaged in that the lone pair of electrons on the nitrogen atom can form a coordinate bond with a lithium cation, thus promoting the cation and anion dissociation in the solution. Electrolyte materials in which lithium ions are dissolved in a polymer matrix can tend to have low ionic conductivity. But gel type electrolytes in which a solvent is present together with the polymer can have a higher ionic conductivity without compromising the stability of the electrolyte. Especially attractive are covalently crosslinked gel electrolytes, in which the solvent swells the crosslinked polymer network. In such systems, the solvent can increase the mobility of the lithium cations, while the crosslinks can maintain a rubber-like mechanical behavior. In crosslinked gels, the conductivity is not hampered by the presence of crystalline microdomains as in plasticized semicrystalline solid polymers, and no continuous pathways exist for possible lithium dendrite growth as in porous "gel" electrolytes. However, excessive swelling and dilution of crosslinked polymers can also generally degrade their mechanical properties, so the person of ordinary skill in the art will appreciate that there exists a trade-off between maximizing conductivity and maintaining desirable mechanical behavior.

As noted above, the electrolyte material includes a polymer of ethyleneimine. Polymers of ethyleneimine are especially desirable because they can have low glass transition temperatures and high ionic conductivity and are easily randomly crosslinked via primary and secondary amine groups. The amines in the backbone and end groups of polymers of ethyleneimine can coordinate with the lithium cation, reducing the binding energy between lithium and its counter-anion (e.g. perchlorate), thereby increasing the concentration of loosely bound lithium cations available for ionic conduction.

The polymer of ethyleneimine can be present in the electrolyte material at a variety of levels, as would be determined by the person of ordinary skill in the art. For example, in certain embodiments, the polymer of ethylene imine) is present in the electrolyte material in an amount in the range of about 35 wt % to about 65 wt %, or about 35 wt % to about 60 wt %, or about 35 wt % to about 55 wt %, or about 35 wt % to about 50 wt %, or about 40 wt to about 65 wt %, or about 40 wt % to about 60 wt %, or about 40 wt % to about 55 wt %, or about 40 wt % to about 50 wt %, or about 45 wt to about 65 wt %, or about 45 wt % to about 60 wt %, or about 45 wt % to about 55 wt %, or about 45 wt % to about 50 wt %, or about 50 wt to about 65 wt %, or about 50 wt % to about 60 wt %, or about 50 wt % to about 55 wt %, or about 46 wt % to about 54 wt %.

A variety of polymers of ethyleneimine can be used in formulating the electrolyte materials as described herein. It is desirable that the polymer of ethyleneimine have a substantially amine character. Accordingly, in certain desirable embodiments, the polymer of ethyleneimine has at least about 50 wt %, at least about 70 wt %, at least about 80 wt %, at least about 90 wt %, at least about 95 wt %, or at least about 99 wt % ethyleneimine subunits. For example, in one embodiment, the polymer of ethyleneimine is poly(ethyleneimine). Other suitable polymers of ethyleneimine include copolymers of ethyleneimine with other monomers, e.g., alkylene oxides, for example, a copolymer of ethyleneimine with ethylene oxide and/or propylene oxide. The polymer of ethyleneimine can be, for example, substantially linear, or branched. In certain desirable embodiments, highly branched polymers of ethyleneimine are used in order to provide increased levels of cross-linking. The polymer of ethyleneimine can be of sufficient molecular weight to provide the desired gel properties to the electrolyte material. For example, in certain embodiments, the polymer of ethyleneimine has a molecular weight (e.g., in a non-crosslinked form) in the range of about 1000 g/mol to about 100,000 g/mol. Of course, the person of ordinary skill in the art will appreciate that a variety of molecular weights may be used.

In certain embodiments, to provide a gel electrolyte material, the polymer of ethyleneimine can be at least partially crosslinked. The person of ordinary skill in the art will select a crosslinker and crosslink density in order to provide the desired rheological properties to the gel electrolyte. The polymer of ethyleneimine can be, for example, crosslinked with residues derived from a polyfunctional epoxide crosslinker, for example, bisphenol A diglycidyl ether. In use, the polymer of ethyleneimine is desirably fully crosslinked, i.e., there is substantially no unreacted crosslinker in the electrolyte material. Of course, in other embodiments, the polymer of ethyleneimine can be partially crosslinked, i.e., with some fraction of unreacted crosslinker moieties remaining in the electrolyte material. As the person of ordinary skill in the art will appreciate, in many circumstances a partially crosslinked material will provide acceptable properties to the electrolyte material.

In other embodiments, the electrolyte material is not substantially crosslinked. In such embodiments, the electrolyte material can include a crosslinker. Such materials can be useful in the fabrication of devices. For example, a material including a not substantially crosslinked polymer of ethyleneimine and a crosslinker can be used in the fabrication of the device, then crosslinked to provide a substantially crosslinked polymer of ethyleneimine after it is deposited at the desired site in the device.

Thus, in certain embodiments, the electrolyte material optionally includes a crosslinker (i.e., either free or in reacted form with the polymer of ethyleneimine). A variety of crosslinkers can be used in the electrolyte materials described herein. For example, in certain embodiments, the crosslinker is a polyfunctional (e.g., bifunctional) epoxide crosslinker, such as bisphenol A diglycidyl ether.

The crosslinker or the residues derived therefrom (e.g., bisphenol A diglycidyl ether or residues derived therefrom) can be, for example, present in an amount up to about 4 wt %, or up to about 3 wt %, or up to about 2 wt %, or up to about 1.5 wt %, or up to about 1 wt %, or in the range of about 0.1 wt % to about 4 wt %, or about 0.1 wt % to about 3 wt %, or about 0.1 wt % to about 2 wt %, or about 0.1 wt % to about 1.5 wt %, or about 0.1 wt % to about 1 wt %, or about 0.4 wt % to about 4 wt %, or about 0.4 wt % to about 3 wt %, or about 0.4 wt % to about 2 wt %, or about 0.4 wt % to about 1.5 wt %, or about 0.4 wt % to about 1 wt %, or about 0.7 wt % to about 4 wt %, or about 0.7 wt % to about 3 wt %, or about 0.7 wt % to about 2 wt %, or about 0.7 wt % to about 1.5 wt %, or about 0.7 wt % to about 1 wt %, or about 1 wt % to about 4 wt %, or about 1 wt % to about 3 wt %, or about 1 wt % to about 2 wt %, or about 1 wt % to about 1.5 wt % (i.e., either as free crosslinker, or in reacted form with the polymer of ethyleneimine (i.e., as residues derived from the crosslinker).

In other embodiments, no crosslinker (e.g., bisphenol A diglycidyl ether) is present.

The electrolyte material also includes a lithium salt. The lithium salt can be, for example, lithium perchlorate. The person of ordinary skill in the art will appreciate that other lithium salts, such as lithium hexafluorophosphate, lithium tetrafluoroborate and lithium triflate can be used. The person of ordinary skill in the art will select an appropriate lithium salt based on the other components of the electrolyte material. The inventors have noted that triflate can in certain embodiments be an undesirable anion when used with ProDot electrochromic polymers. The lithium salt (e.g., lithium perchlorate) can be present in the electrolyte material in an amount in the range of about 0.2 wt % to about 5 wt %, or about 0.2 wt % to about 3 wt %, or about 0.2 wt % to about 2 wt %, or about 0.2 wt % to about 1.5 wt %, or about 0.5 wt % to about 5 wt %, or about 0.5 wt % to about 3 wt %, or about 0.5 wt % to about 2 wt %, or about 0.5 wt % to about 1.5 wt %, or about 1 wt % to about 5 wt %, or about 1 wt % to about 3 wt %, or about 1 wt % to about 2 wt %, or about 1 wt % to about 1.5 wt %, or about 1.5 wt % to about 5 wt %, or about 1.5 wt % to about 3 wt %, or about 1.5 wt % to about 2 wt %.

Finally, in order to provide the electrolyte material with the rheology of a gel and a relatively high ion mobility, the electrolyte material can include a high-boiling solvent (i.e., having a boiling point in excess of 100° C., 125° C., or even 150° C. The solvent desirably swells, (for example, swelling but not dissolving) the polymer of ethyleneimine, and desirably has a high dielectric constant (e.g., greater than about 20 or even greater than about 30) and/or a high boiling point (e.g., at least about 100° C., at least about 125° C. or even at least about 150° C.). For example, in certain embodiments, the solvent is DMSO. In other embodiments, the solvent is, for example, dimethylformamide, hexamethylphosphoramide or propylene carbonate. The person of ordinary skill in the art will select an appropriate solvent depending on the particular identity of the materials used in the construction of the electrolyte and of the remainder of the electrochromic device. In certain embodiments, the solvent (e.g., DMSO) is present in an amount in the range of about 20 wt % to about 64 wt %, or about 26 wt % to about 64 wt %, or about 35 wt % to about 64 wt %, or about 43 wt % to about 64 wt %, or about 53 wt % to about 64 wt %, or about 20 wt % to about 53 wt %, or about 26 wt % to about 53 wt %, or about 35 wt % to about 53 wt %, or about 43 wt % to about 53 wt %, or about 20 wt % to about 46 wt %, or about 26 wt % to about 46 wt %, or about 35 wt % to about 46 wt %.

The electrolyte material described herein can be substantially formed from the polymer of ethyleneimine, the lithium salt (e.g., lithium perchlorate), the solvent (e.g., DMSO) and the optional crosslinker (e.g., bisphenol A diglycidyl ether). In certain embodiments, the the sum of the amounts of the solvent (e.g., DMSO), the polymer of ethyleneimine, the lithium salt (e.g., lithium perchlorate) and the optional crosslinker (e.g., bisphenol A diglycidyl ether) is at least about 80 wt %, at least about 85 wt %, at least about 90 wt %, at least about 95 wt %, or at least about 99 wt % of the electrolyte material In one embodiment, the electrolyte material consists essentially of the solvent (e.g., DMSO), the polymer of ethyleneimine, the lithium salt (e.g., lithium perchlorate) and, optionally, a crosslinker (e.g., diglycidyl ether of bisphenol A) or residues derived therefrom.

Of course, the person of ordinary skill in the art will appreciate that the electrolyte materials can include other materials (e.g., in minor amounts), such as those commonly found in gel electrolyte materials In view of the description herein, the person of ordinary skill in the art can formulate electrolyte materials having desirable properties for use in electrochromic devices like electrochromic windows. For example, in certain embodiments, the electrolyte material has an ionic conductivity of at least about 5 μS/cm, for example, at least about 10 μS/cm, or at least about 50 μS/cm, or even at least about 100 μS/cm. The person of ordinary skill in the art can, based on the description herein, provide a desired ionic conductivity to the material.

As described above, the electrolyte materials described herein are desirably relatively high in transmittance of visible radiation in one of its redox states. For example, in certain embodiments, the electrolyte material has a % transmittance at 580 nm of at least about 50%, at least about 60%, or at least about 65% per 100 μm thickness at 20° C., 40° C., 60° C., 80° C. or 100° C. Notably, the electrolyte materials desirably have high transmittance even at higher temperatures, so that electrochromic windows using them can be used in applications requiring heat resistance, e.g., as sunroofs in cars.

Another embodiment of the disclosure is an electrochromic device. One example of such an electrochromic device is shown in schematic view in FIG. 2. Electrochromic device 200 includes an electrochromic material 210, a counterelectrode 220, and an electrolyte material 230 disposed between the counterelectrode. The counterelectrode is capable of electrochemically reversibly absorbing lithium ions into the electrolyte and releasing lithium ions into the electrolyte. The electrolyte material is desirably in contact with the counterelectrode and the electrochromic material, such that lithium ions can be passed between the counterelectrode and the electrochromic material through the electrolyte material. As the person of ordinary skill in the art will appreciate, any of the electrolyte materials described herein can be used as the electrolyte material 230. The electrolyte material can be provided in a variety of thicknesses, for example, in the range of about 25 μm to about 500 μm, e.g., in the range of about 25 μm to about 300 μm, or about 25 μm to about 200 μm, or about 25 μm to about 100 μm, or about 50 μm to about 500 μm, or about 50 μm to about 300 μm, or about 50 μm to about 200 μm, or about 50 μm to about 100 μm, or about 100 μm to about 500 μm, or about 100 μm to about 300 μm, or about 100 μm to about 200 μm. As the person of ordinary skill in the art will appreciate, spacers can be used to provide the desired thickness of the electrolyte layer. Conventional fabrication techniques can be used to make such devices.

Figure 2:
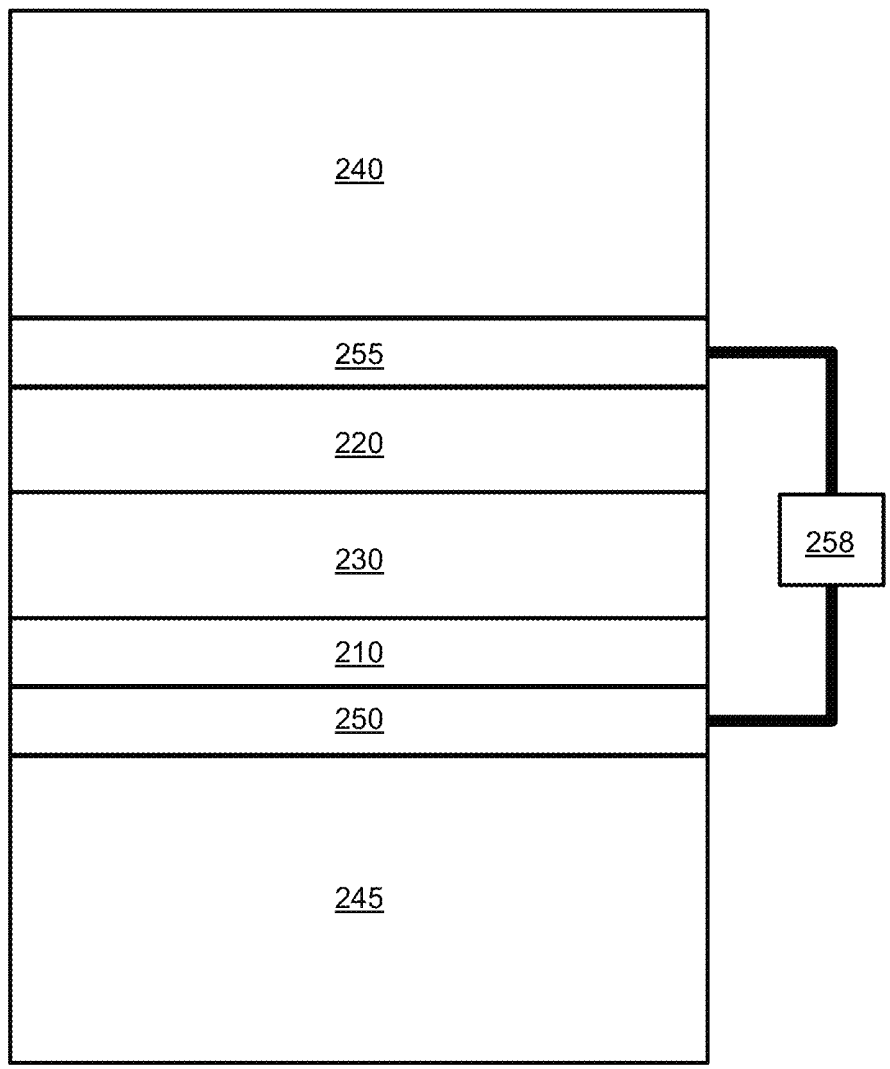
FIG. 2 is a schematic cross-sectional view of an electrochromic device according to one embodiment of the disclosure.

In certain embodiments, the electrochromic material, the counterelectrode and the electrolyte material are disposed between two bodies of transparent media. For example, as shown in FIG. 2, electrochromic material 210, counterelectrode 220 and an electrolyte material 230 are disposed between two bodies of transparent media 240, 245. The transparent media can be, for example, glass or plastic, e.g., sufficiently transparent to act as a window.

The device can also include one or more layers of transparent conductive material disposed along the electrochromic material and/or the counterelectrode (e.g., along their sides opposite the electrolyte material). In FIG. 2, reference numerals 250 and 255 denote layers of transparent conductive material. The transparent conductive material can be, for example, a transparent oxide, such as indium-tin oxide. Each layer of transparent conductive material can help to distribute the field over wide devices areas, in cases where the conductivity of the electrochromic material or counterelectrode is not sufficiently high.

The device can further include a voltage source operatively coupled to the electrochromic material and the counterelectrode. The coupling can be made through, for example, the layer(s) of transparent conductive material, if present. A voltage source is indicated in FIG. 2 by reference numeral 258. The voltage source can be configured to apply an appropriate voltage to switch the opacity of the window, for example, a voltage in the range of about 0.5 V to about 10 V, or about 0.5 V to about 7 V, or about 0.5 V to about 5 V, or about 0.5 V to about 3 V, or about 0.5 V to about 2

V, or about 1 V to about 10 V, or about 1 V to about 7 V, or about 1 V to about 5 V, or about 1 V to about 3 V, or about 1 V to about 2 V. Of course, depending on the particular materials used and the particular structure of the device, different voltages may be used.

As the person of ordinary skill in the art will appreciate, a wide variety of Type III electrochromic materials can be used in the devices described herein. For example, in certain embodiments, the electrochromic material is a pi-conjugated organic polymer, such as a polythiophene, a polypyrrole, a polyaniline, a polyfuran, a polycarbazole, a polyazulene or a polyindole. In certain embodiments, the electrochromic material is a polythiophene, such as a poly(3,4-ethylenedioxythiophene) or a poly(3,4-propylenedioxythiophene).

Pi-conjugated organic polymers can combine mechanical flexibility and ease in bandgap/color-tuning via structural control, along with the potential for low-cost scalability and processing, and thus are attractive as electrochromic materials. Chemical or electrochemical oxidation of numerous resonance-stabilized aromatic molecules, such as pyrrole, thiophene, aniline, furan, carbazole, azulene, indole, and others, can be used to produce such polymers, as the person of ordinary skill in the art would appreciate. Such polymers are electrochromic when redox switching giving rise to new optical absorption bands in accompaniment with simultaneous transport of electronic charge and counter ions in the polymer matrix. Oxidative p-doping shifts the optical absorption band towards the lower energy part of the spectrum. The color change or contrast between doped and undoped forms of the polymer depends on the magnitude of the bandgap of the undoped polymer. Thin films of conducting polymers with $E_g$ greater than 3 eV (400 nm) are colorless and transparent in the undoped form, while in the doped form they are generally absorbing in the visible region. Those with $E_g$ equal to or less than 1.5 eV (800 nm) are highly absorbing in the undoped form but, after doping, the free carrier absorption is relatively weak in the visible region as it is transferred to the near infrared. Polymers with intermediate gaps have distinct optical changes throughout the visible region and can be made to induce many color changes Polythiophenes are of interest as electrochromic materials due to their ease of chemical and electrochemical synthesis, environmental stability, and processability. A large number of substituted thiophenes has been synthesized, and this has led to the study of numerous novel polythiophene(s), with particular emphasis on poly(3-substituted thiophenes) and poly(3,4-disubstituted thiophenes). Thin polymeric films of the parent polythiophene are blue (730nm) in the doped (oxidized) state and red (470 nm) in the undoped form. However, due to its lower oxidation potential, the electropolymerization and switching of 3-methylthiophene have been more intensively studied than the parent thiophene. Furthermore, the introduction of a methyl group at the b position of the thiophene ring leads to a signficant increase of the polymer conjugation length and hence electronic conductivity. This effect has been attributed to the statistical decrease in a number of a-b0 couplings and to the decrease of the oxidation potential caused by the inductive effect of the methyl group. Poly(3-methylthiophene) is purple when neutral with an absorption maximum at 530 nm (2.34 eV) and turns pale blue on oxidation.

Generally, the tuning of color states in pi-conjugated polymers is possible by suitable choice of the monomer (e.g., base ring structure and substitutions thereon). This represents a major advantage of using conducting polymers for electrochromic applications. Subtle modfications to the monomer can signficantly alter spectral properties. For example, the colors available with polymer films prepared from 3-methylthiophene-based oligomers are strongly dependent on the relative positions of methyl groups on the polymer backbone. Colors available include pale blue, blue and violet in the oxidized form, and purple, yellow, red and orange in the reduced form. The color variations have been ascribed to changes in the effective conjugation length of the polymer chain. Cast films of chemically polymerized thiophene-3-acetic acid reversibly switch from red to black on oxidation, demonstrating that subtle changes in structure can cause large effects in the colored states.

The effects of steric factors has been studied with respect to the electronic properties of poly-thiophenes with 3,4-dialkyl substituents. In principle, disubstitution should provide the synthetic basis to perfectly stereoregular polymers. However, this approach can be limited by the steric interactions between substituents, which lead to a decrease in polymer conjugation length. In fact, poly(3,4-dialkylthiophenes) have higher oxidation potentials, higher optical bandgaps, and lower conductivities than poly(3-alkylthiophenes). Cyclization between the 3 and 4 positions relieves steric hindrance in thiophenes, but such monomers can be harder to electropolymerize than 3-methylthiophene. Dimethyl 3,4-dipropoxythiophene polymers (ProDOT-Me$_2$, polymer of 3,3-dimethyl-3,4-dihydro-2H-thieno[3,4-b][1,4]dioxepine) has been synthesized. The methyl groups at the 3 position of the dioxepine do not appear to give rise to significant steric interactions. In the publication the synthesis of ProDOT was performed through williamson ether synthesis with 1,3 dibromopropane and 3,4-dihydroxythiophene-2,5diethylcarboxylate and subsequent ester hydrolysis and decarboxylation. In this case, higher dialkoxythiophene like 3,4-diethoxy and 3,4dipropoxythiophene which exhibits enhanced storage stability can also function as starting materials. The di-hydroxy functional compound is generally observed as the by product especially when excessive neopentyl glycol is used to ensure that the reaction is complete. The switching speed of ProdDOT-Me2 from almost fully transparent, oxidized state to dark blue, reduced state is an order magnitude higher thanits polyalkylthiophene counterparts and about three to seven times higher than PEDOT (poly(3,4-ethylenedioxythiophene).

Certain suitable electrochromic materials are described in E. Steckhan, Ed., Electrochemistry IV, vol. 152. Berlin/Heidelberg: Springer-Verlag, 1990; J. Roncali, Conjugated poly(thiophenes): synthesis, functionalization, and applications, Chem. Rev., vol. 92, no. 4, pp. 711738, Jun. 1992; and M. Mastragostino, C. Arbizzani, A. Bongini, G. Barbarella, and M. Zambianchi, Polymer-based electrochromic devices. Poly(3-methylthiophenes), Electrochim. Acta, vol. 38, no. 1, pp. 135140, January 1993, each of which is hereby incorporated herein by reference in its entirety. Other electrochromic materials are described in U.S. Patent Application Publications nos. 2007/0188845, 2004/0143091, 2002/0196518, 2009/0067030 and 2010/0324306, and International Patent Application Publication nos. 2005/084350, 2006/029344, each of which is hereby incorporated by reference in its entirety.

Similarly, as the person of ordinary skill in the art will appreciate, a wide variety of counterelectrode materials may be used in practicing the materials and devices described herein. The counterelectrode material acts as an ion storage material, reductively absorbing lithium ions as they are released by the electrochromic film. The choice of counterelectrode material is important especially in window application, as high transmittance is desired in the state in which the electrochromic material is transmissive. Moreover, electrochromic materials like ProDOT-Me$_2$ exhibit a relatively fast switching speed of a few seconds; the counterelectrode material desirably is capable of absorbing ions at a rate and in an amount similar to the discharge of the electrochromic material.

Vanadium oxides have been thoroughly investigated for their ionic storage properties as a counterelectrode in batteries and, more recently, their suitability as a counterelectrode for inorganic electrochromic devices. The layered morphology of vanadium pentoxide (V2O5) promotes the intercalation of Li$^+$ ions, via the equation below:

$$V_2O_5 + xe^- + xLi^+ \rightarrow Li_xV_2O_5$$

However, vanadium oxides tend to display adverse coloration upon lithium insertion and extraction, depending on film thickness, ranging from light yellow to orange in the oxidized state to dark green and black in the reduced state. The lack of a visibly transparent state is detrimental to vanadium oxides use in optical devices like windows, and limits the thickness of the film that can be employed.

However, mixed films of V$_2$O$_5$ and TiO$_2$ can provide the desired transaparency. V$_2$O$_{5\_}$TiO$_2$ films can be grey in the reduced state, yet maintain transmittance over 75% at desirable thicknesses for the device (e.g., about 1 mm, or as electrochemically deposited at an applied voltage of 3.5 V for 45 seconds using a chromoamperometry technique). In the oxidized state, V$_2$O$_{5\_}$TiO$_2$ films can be yellowish, and have transparency over 80% Thus, in certain embodiments, the counterelectrode material is V$_2$O$_{5\_}$TiO$_2$. The ratio of V$_2$O$_5$ toTiO$_2$ can vary, as the person of ordinary skill in the art will appreciate. In certain embodiments, the ratio of V$_2$O$_5$ toTiO$_2$ is about 7:3 by volume. In other embodiments, the ratio of V$_2$O$_5$ toTiO$_2$ is in the range of 5:5 to 9:1 by volume, for example, 6:4 to 8:2, or 65:35 to 75:25 by volume.

Many of the optical and electrical properties of vanadium oxide thin films deposited under RF and DC sputtering and evaporation are well characterized. Sol-gel processes can be especially useful in making such films, due to the relative low cost of equipment involved and process flexibility.

Another aspect of the disclosure is a method for actuating an electrochromic device. The method includes providing an electrochromic device as described herein and switching the electrochromic material between a more transparent state to a less transparent state (e.g., from more transparent to less transparent, or vice versa) by the application of a voltage across the conductive material and the electrochromic material. The actuation can be performed, for example, at a variety of temperatures, e.g., in the range of about −20 to about 100° C., or about −10 to about 80° C., or about 0 to about 80° C. The applied voltage can be, for example, a voltage in the range of about 0.5 V to about 10 V, or about 0.5 V to about 7 V, or about 0.5 V to about 5 V, or about 0.5 V to about 3 V, or about 0.5 V to about 2 V, or about 1 V to about 10 V, or about 1 V to about 7 V, or about 1 V to about 5 V, or about 1 V to about 3 V, or about 1 V to about 2 V. Of course, depending on the particular materials used and the particular structure of the device, different voltages may be used.

The invention will further be described by the following non-limiting experimental study.

Experimental Study

The aim of the study was to develop ECWs that can be used as sunroofs in automobiles. Automobile sunroofs can experience high temperatures throughout the day. Therefore, it is important to design an ECW that can function efficiently ata wide range of temperatures. In this study, an ECW is developed to operate with good optical contrast and switching speed in the temperature range of 20° C. to 120° C. The individual components of ECW are tested for heat resistance. The gel electrolyte was found to be the most vulnerable component of the ECW, and a new gel electrolyte with higher heat resistance has been developed.

Components of ECW

The ECW includes three main components:
1. An electrochromic material (e.g., fashioned as a "working electrode (WE)"),
2. A counterelectrode (CE) that acts as ion storage material, which stores lithium and releases lithium cations into the electrolyte (depending on whether the electrochromic material is being oxidized or reduced. This helps lend stability to the ECW,
3. A transparent electrolyte.

The electrochromic material and the counterelectrode material are deposited on conductive oxides, like an indium tin oxide(ITO) coated glass substrate. The conductive oxide coated glass substrate gives the device more stability and improves the electric conductivity of the overall working electrode and counterelectrode structure. Depending on the electrochromic material the material can become transparent when oxidized and colored when neutral. In this study, poly (3,3-dimethyl-3,4-dihydro-2H-thieno[3,4-b][1,4]dioxepine), PPRODOT-Me2 was the electrochromic material in the working electrode, V$_2$O$_{5\_}$TiO$_2$ was the counterelectrode material and poly(ethyleneimine) based electrolytes were used develop heat resistant electrochromic window.

Figure 3:
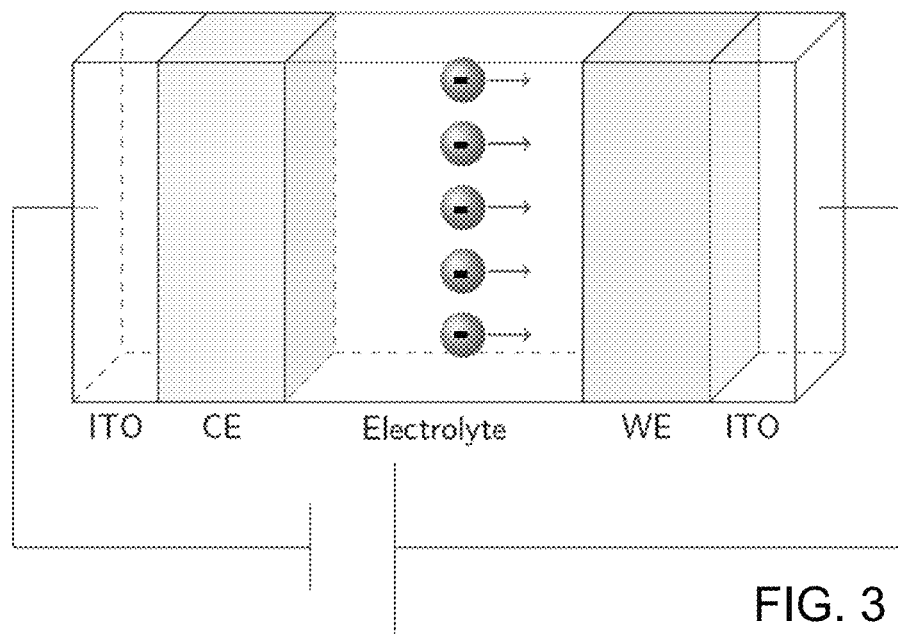
FIG. 3 is a schematic partial perspective view of an electrochromic window during an electrochemical oxidation of the electrochromic film.

Once assembled, the transmittance of the ECW can be tuned by varying the applied voltage. When positive voltage is applied to the working electrode (as compared to the counterelectrode), electrons are drawn from the electrochromic film, thus oxidizing the film, as shown in FIG. 3. The oxidized PPRODOT-Me$_2$ is highly transparent and has a transparency of 71% at 580nm at room temperature at a thickness of about 100 μm.

Figure 4:
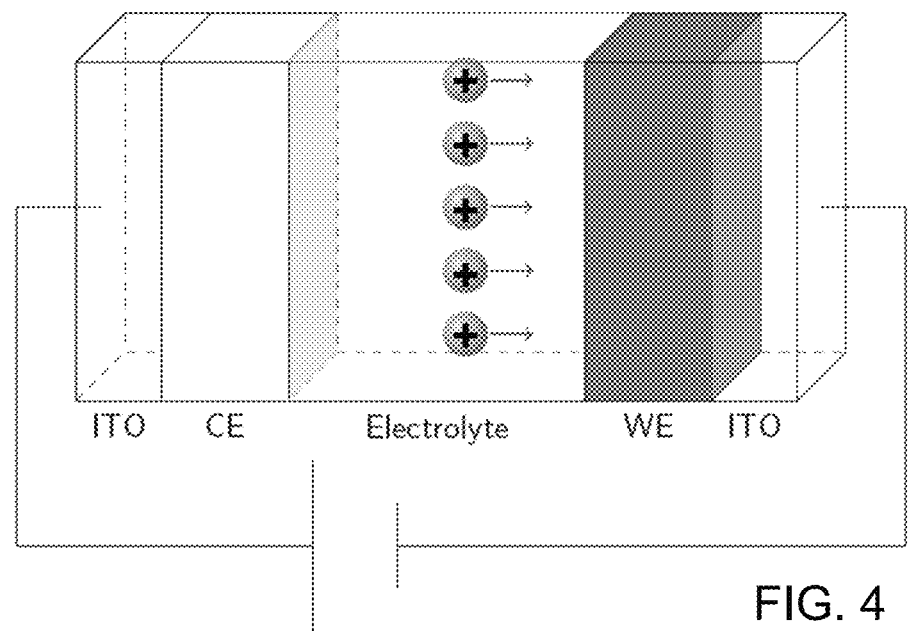
FIG. 4 is a schematic partial perspective view of an electrochromic window during an electrochemical reduction of the electrochromic film.

On the other hand, when negative voltage is applied to the working electrode, electrons are inserted into the PPRODOT-Me$_2$ thus making the film neutral, as shown in FIG. 4. The neutral PPRODOT-Me$_2$ turns dark blue and opaque with a transmittance less than 5%. When negative voltage is applied to the working electrode the lithium cations are attracted to it. The insertion of Lithium ions into the PPRODOT-Me$_2$ film gives the film optical color memory. Thus the developed ECW is more energy efficient since it does not require continuous supply of voltage.

When negative voltage is applied to the counterelectrode, as shown in FIG. 4, lithium ions are reduced and intercalate in the film as LiV$_2$O$_5$, thus providing an overall reduction to the film. While the V$_2$O$_{5\_}$TiO$_2$ film turns grey upon reduction, the reduced state maintains high transmittance of over 75% at a thickness of about 100 μm. Upon application of positive voltage, as shown in FIG. 3, LiV$_2$O$_5$ species are oxidized to V$_2$O$_5$, releasing lithium ions to the electrolyte. The oxidized V$_2$O$_{5\_}$TiO$_2$ film is light yellow, with a transmittance on the order of 80% at a thickness of about 100 μm. Since the counterelectrode material is highly transparent in the reduced state, it does not drastically reduce the performance of the ECW when operating in the transparent mode.

In this study, a poly(ethyleneimine)-based electrolyte was developed. An electrolyte for an ECW has three important requirements: it should be highly transparent so as not to interfere with the working of the ECW; it should have high ionic conductivity to ensure high switching speed between the opaque and transparent states of the ECW, and it should be chemically and physically compatible with the working and counter electrode material to ensure smooth functioning of ECW.

PProDOT-Me2 Film as the Working Electrode

Figure 5:
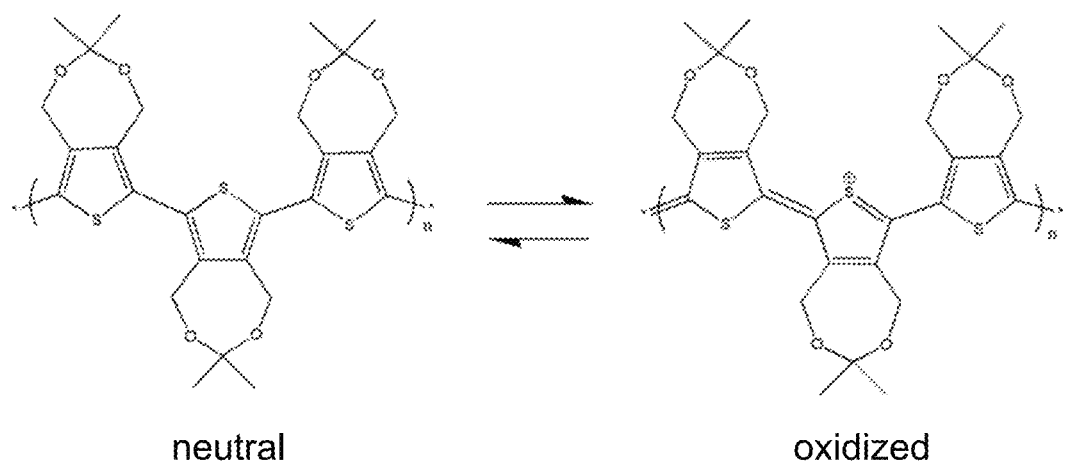
FIG. 5 is a diagram demonstrating changes in molecular structure upon oxidation and reduction of a polythiophene.

The PProDOT-Me$_2$ film turns transparent upon oxidation and turns opaque upon reduction. This modification in the optical property of the conjugated polymer can be attributed to the modification to the structure of PProDOT-Me$_2$ upon reduction and oxidation, as shown in FIG. 5.

When the conjugated polymer is oxidized, it becomes a conducting polymer. Increase in electron delocalization along the backbone of the polymer increases the conjugation length of the polymer which reduces the band gap between the highest occupied molecular level (HOMO) and lowest unoccupied molecular level (LUMO) level of the polymer. Creation of this new band gap modulates the optical property of the conjugated polymer. See, e.g., Xu, J. et al., Electrochemical copolymerization of indole and 3,4-ethylenedioxythiophene, Journal of Materials Science, 40(11), 2867-73 (2005), which is hereby incorporated herein by reference in its entirety. In PProDOT-Me$_2$, the band gap is 1.7eV which corresponds to a wavelength of 715 nm. By altering the wavelength we can alter the color of the conducting polymer.

Electropolymerization of ProDOT-Me$_2$

The person of ordinary skill in the art will appreciate that chemical or electrochemical polymerization methodologies may be used to make various electrochromic polymers. See also Funt, B. L., & Bhadani, S., "ELECTROINITIATED POLYMERIZATION OF STYRENE: II. KINETICS IN SOLUTIONS OF TETRAMETHYLAMMONIUM SALTS," Canadian Journal of Chemistry, 42(12), 2733-2738 (1964); Inzelt, G, Conducting Polymers. Berlin, Heidelberg: Springer Berlin Heidelberg (2012), each of which is hereby incorporated herein by reference in its entirety. Chemical polymerization uses chemical oxidants resulting in the formation of more bulk like material precipitated from the reaction mixture. It involves immersion of solid substrate into the solution containing corresponding monomer and oxidant. Due to the monomer oxidation, the substrate is coated with a thin polymer film. In this method, it can be difficult to control the thickness of the polymer film on the substrate. Electrochemical polymerization involves electrochemical oxidation of a corresponding monomer on a substrate that acts as an electrode, with precipitation of the polymer on the surface. In this method film thickness can be more precisely controlled. Accordingly, electrochemical fabrication technique was used to make PProDOT-Me2 in this study. Chronoamperometric and gravimetric techniques allow determination of the general kinetic electropolymerization, the order of the reaction with respect to the monomer, solvent and the electrolyte.

An ITO coated glass (6 Ω/square, 76 mm×76 mm dimensions, Thin Film Devices) was washed with an ethanolamine aqueous solution and rinsed with DI water. It was cleaned under UV ozone and dried at 110° C. overnight before use. A cleaned ITO/glass substrate, a platinum plate counter electrode and a silver wire reference electrode were submerged in a ProDOT-Me$_2$/LiClO$_4$/acetonitrile (ACN) solution. The PProDOT-Me$_2$ coating was deposited by a chronoamperometry program in an electrochemical analyzer (CHI 605A, CH Instruments). A three electrode cell with Ag/Ag+ as a reference, ITO glass as a working electrode and a Pt plate (25 mm×25 mm×1.0 mm) as a counter electrode was used for electropolymerization. The overall experimental process was carried out at 25° C. in argon atmosphere. The applied potential was 1.6 V and polymerization time varied from 2 to 15 s. Monomer and electrolyte concentrations varied keeping one of them constant to evaluate their respective reaction orders. The electrolyte concentrations varied from 0.1 to 0.5 M and the constant monomer concentration was 0.015 M. Monomer concentrations ranged from 0.015 to 0.05 M with the constant electrolyte concentration, 0.1 M. LiClO$_4$ in propylene carbonate (PC) was used as the electrolyte for redox systems of the films. The total charge of the film was monitored as a function of time in a chronocoulometry program. Optical transmittance spectra of the films were examined in the wavelength range of 300800 nm using a UV/VIS/NIR spectrophotometer (V-570, JASCO, and MDT). Under these conditions, the inventors determined a favorable polymerization time of 15 seconds, although the person of ordinary skill in the art will appreciate that other times may be used. See, e.g., Kim, Sooyeun, and Minoru Taya. "Electropolymerization kinetic study of 3,3-dimethyl-3,4-dihydro-2H-thieno [3,4-b][1,4]dioxepine and its optical optimization for electrochromic window applications." Electrochimica Acta 55(19), 5307-5311 (2010), which is hereby incorporated herein by reference in its entirety.

Heat Resistance of the PProDOT-Me$_2$ Film

Figure 6:
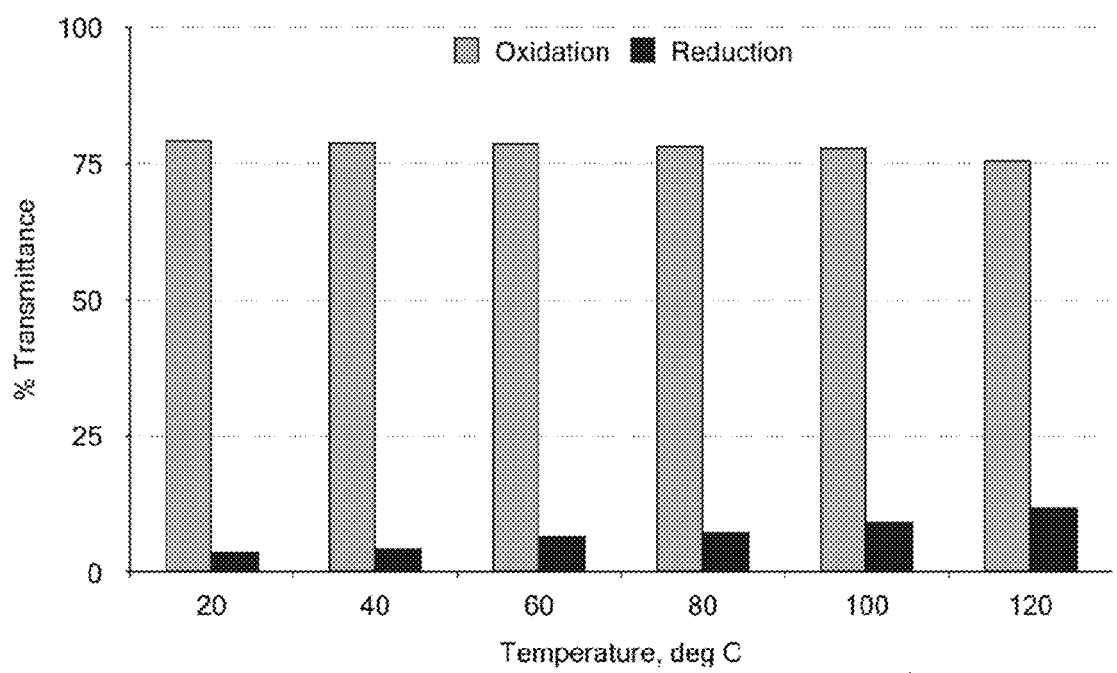
FIG. 6 is a graph showing the transmittances of an example electrochromic device at different temperatures.

To develop a high temperature resistant ECW, the individual components are desirably themselves heat resistant. The heat resistance of a PProDOT-Me$_2$ fillm was tested by subjecting the neutral and oxidized films to high temperature. The films were about 100 μm thick. The transmittance was measured at 20° C., 40° C., 60° C., 80° C., 100° C. and 120° C. to measure the progressive variation in transmittance of the film over temperature, shown in FIG. 6 FIG. 6 demonstrates that the contrast between the opaque and transparent states decreases somewhat at higher temperatures. The reduction in contrast is due to the decrease in transmittance in the oxidized state and increase in transmittance in the reduced state. The transmittance decreases by about 5% from 20° C. to 120° C. in the oxidized state and the transmittance increases by about 8% from 20° C. to 120° C. in the neutral state. Even so, the system is stable at temperatures likely to be experienced by a sunroof material.

V$_2$O$_5$_TiO$_2$ Film as Counter Electrode

In this study, sol-gel processing was used to develop a V$_2$O5–TiO$_2$ film with 300 nm thickness. Solution preparation involved the synthesis of V$_2$O$_5$·nH$_2$O using method described by Takahashi et al, Synthesis and Electrochemical Properties of Single-Crystal V$_2$O$_5$ Nanorod Arrays by Template-Based Electrodeposition, The Journal of Physical Chemistry B, 108(28), 9795-9800 (2004), which is hereby incorporated herein by reference in its entirety. Crystalline V$_2$O$_5$ powder was dissolved in a hydrogen peroxide solution at a molar ratio of 8:1 (H$_2$O$_2$ to V$_2$O$_5$). The ensuing reaction results in the breakdown of H$_2$O$_2$ and V$_2$O$_5$ which reform as VO$^{2+}$ clusters and V(V) peroxo complexes. This VO$^{2+}$ solution appears as a transparent orange solution and changes to a transparent dark red solution after 1 hour of vigorous stirring. Sonicating the solution for 2 hours creates a dark red/brown gel that, studies have shown, leads to V$_2$O$_5$·nH$_2$O layers upon drying. The gel was then dispersed into water creating a dark red transparent solution having a vanadium ion concentration of 0.005 mol/L and pH about 2:7. Thin films were deposited onto an ITO (6 Ω resistance/in$^2$, 76 mm×76 mm) substrate submerged in the V$_2$O$_5$ solution in a three electrode cell and subjected to chronoamperometry technique (CH 1605A, CH Instruments, Electrochemical Analyzer) using a Platinum wire counter electrode and silver wire reference electrode. See Kim, S. et al., "Electropolymerization kinetic study of 3,3-dimethyl-3,4- dihydro-2H-thieno [3,4-b][1,4]dioxepine and its optical optimization for electrochromic window applications." Electrochimica Acta 55(19), 5307-5311 (2010). A voltage of 3V and a deposition time of 130 seconds is applied. Excess liquid was removed from the films which were dried in air for 15 minutes and then baked at 110° C. for 8 hours to remove remaining moisture.

Heat Resistance of $V_2O_5\_TiO_2$ Film

Figure 7:
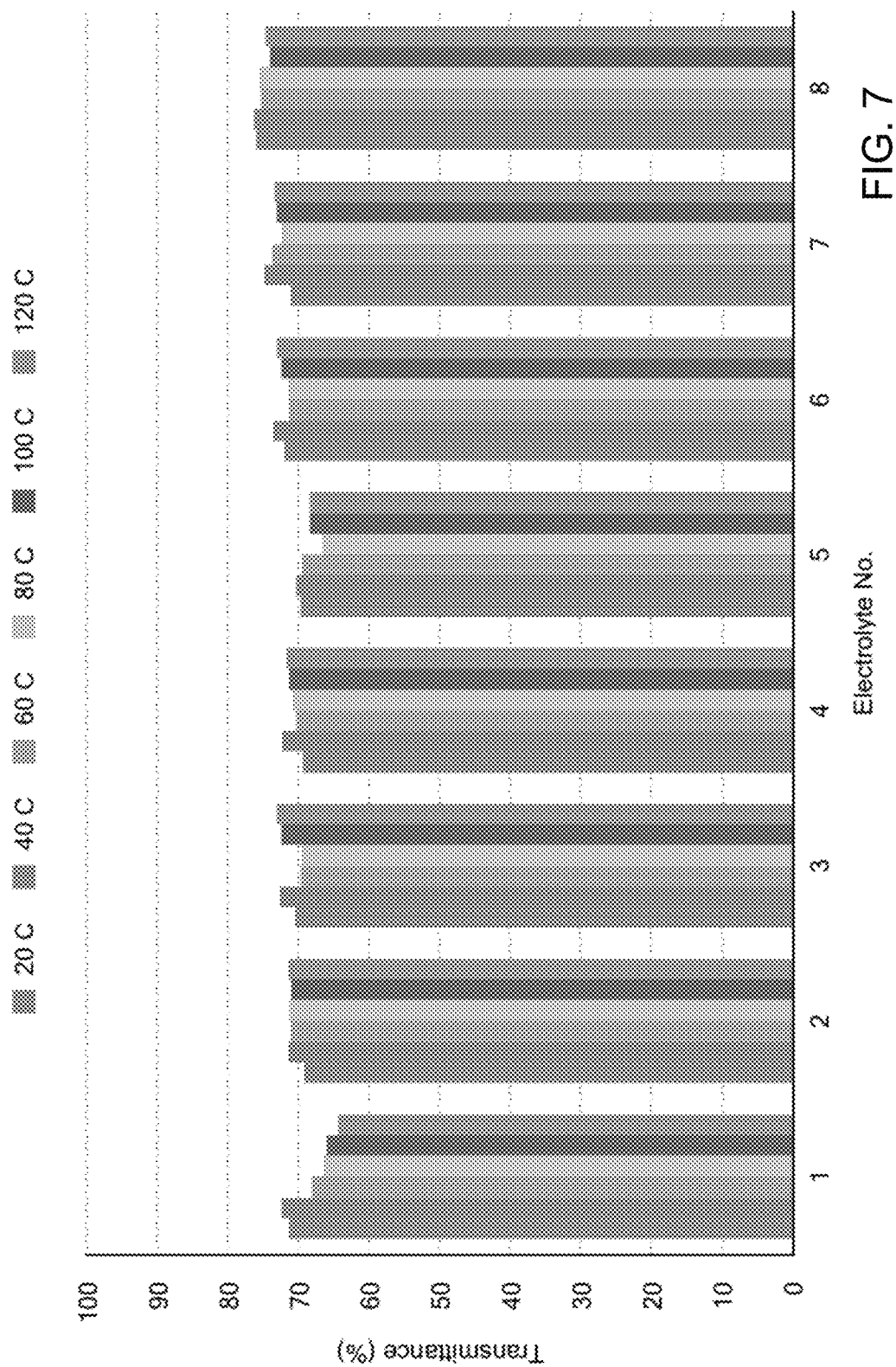
FIG. 7 is a graph showing the transimittances of different example electrolytes at different temperatures, in which each set of bars is, from left to right, 20° C., 40° C., 60° C., 80° C., 100° C. and 120° C.

The heat resistance of the $V_2O_5\_TiO_2$ film was tested over a range of temperature of 20° C., 40° C., 60° C., 80° C., 100° C. and 120° C. to measure the progressive variation in transmittance of the film over temperature, shown in FIG. 7. The $V_2O_5\_TiO_2$ film is relatively stable over a range of temperature, maintaining a transmittance of over 70% in reduced and oxidized state. Such stability of the counter-electrode is as expected since it is a metal oxide composite film.

Preparation of Heat-Resistant poly(ethyleneimine) Electrolytes

While developing poly(ethyleneimine) (PEI) based electrolyte materials, two main requirements were kept in mind: 1) high ionic conductivity before and after heat treatment; and 2) high transparency before and after heat treatment.

Gel type electrolyte materials was developed with PEI as the polymer matrix, dimethyl sulfoxide (DMSO) as the solvent and lithium perchlorate (LiClO$_4$) or lithium triate (LiCF$_3$SO$_3$) as the lithium salt. The solvent of the electrolyte is desirably selected such that it has high dielectric constant and swells the polymer. In this study, DMSO and dimethylformamide (DMF) were considered due to their compatibility with PEI. The dielectric constant of the solvent determines the ionic mobility of the cation and the anion. Thus, the solvent has a huge influence on the ionic conductivity. DMSO has a dielectric constant value of 46.68 and DMF has a dielectric constant of 36.7164. While both can be useful solvents in electrolyte materials as described herein, DMSO was used as the solvent in the studies described here.

Development of PEI-Based Electrolyte Without Crosslinking Agent

Branched Poly(ethylene imine) (PEI), with number average molecular weight of 10,000 Da was purchased from Sigma Aldrich. PEI was dried under vacuum at 70° C. for 24 hours to remove traces of water. Anhydrous DMSO, LiClO$_4$ (metal basis, 99.99%) and LiCF$_3$SO$_3$ were also purchased from Sigma Aldrich. LiClO$_4$ was dried under vacuum for 4 days before use to remove any traces of water. The compositions of Electrolytes 1-8 are provided in Table 1, below. For each Electrolyte, a solution of PEI and DMSO was first prepared according to the weight ratio in Table 1. The solution was allowed to stir for 5 hours. To this solution, the lithium salt (perchlorate or triflate) was added and allowed to stir for 3 hours.

TABLE 1

| Electrolyte No. | Weight Ratio PEI/DMSO/LiClO$_4$(*) or LiCF$_3$SO$_3$(**) |
| --- | --- |
| 1 | 100/114.5/6.04** |
| 2 | 100/114.5/12.1** |
| 3 | 100/110/1.5* |
| 4 | 100/110/3.5* |
| 5 | 100/110/5.32* |
| 6 | 100/66/1.50 |
| 7 | 50/55/3.00 |
| 8 | 50/55/1.5 |

In ECW applications it is desirable for the electrolyte to be gel type and have a viscosity such that it resists flow within and leakage out of the ECW. Therefore, different concentrations of polymer matrix to solvent were used in Electrolytes 1-8. Moreover, the lithium cations form coordinate bonds with lone pair of electrons on nitrogen atom. Therefore, different concentrations of lithium salt relative to polymer matrix were also tested for thermal stability.

Electrolytes were tested for thermal stability. An electrolyte material desirably maintains high ionic conductivity and transmittance before and after heat treatment. The electrolytes were sandwiched between two bare ITO glass substrates(38 mm×38 mm) with a parafilm spacer (about 100 μm in thickness). Each sample was sealed with high temperature resistant epoxy adhesive. The samples were tested at 20° C., 40° C., 60° C., 80° C., 100° C. and 120° C. Up to 100° C. the samples were tested in environmental chamber; the 120° C. experiments were tested on a hot plate since the maximum attainable temperature in the environment chamber was 100° C. The transmittance of the Electrolytes 1 to 8 at different temperatures were measured; results are in FIG. 7. Each of Electrolytes 1-8 had a a reasonably high transmittance of over 65% at all temperatures. For ECW application a transmittance of over 70% at all operating temperatures is preferred. In order to maintain the performance of the ECW even at high temperatures of 120 ° C. the transmittance of the electrolyte layer is desirably consistent and not below 70%. In this case, Electrolyte 8 is the best fit for the requirement. The maximum drop observed in transmittance for Electrolyte 8 was about 3 to 4% even at high temperature and the transmittance is always maintained above 70%. Electrolyte 8 has a ratio of PEI/DMSO/LiClO$_4$ of 50/55/1.5. The ratio of PEI to DMSO was important to maintain the gel like nature and viscosity of the electrolyte. Electrolytes 1 and 2 have lower weight ratios of PEI/DMSO (0.873) and therefore has lower viscosity due to higher solvent concentration. Electrolyte 6 has higher weight ratio of PEI/DMSO (1.515). Electrolytes 3, 4, 5 and 7 have the same PEI/DMSO weight ratio but have different salt concentrations.

While not intending to be bound by theory, it is believed that when the lithium salt is added to PEI, the primary and secondary amines in the polymer chain can form coordinate bonds with lithium cation, thereby aiding in dissociating the salt. The coordinate bond formed between the cation and the primary and secondary amine is believed to provide thermal stability to the electrolyte. Coordinate covalent bonds are formed when one atom does not have a complete outer shell, while another atom does have a complete outer shell and has at least one unshared electron pair.

Figure 8:
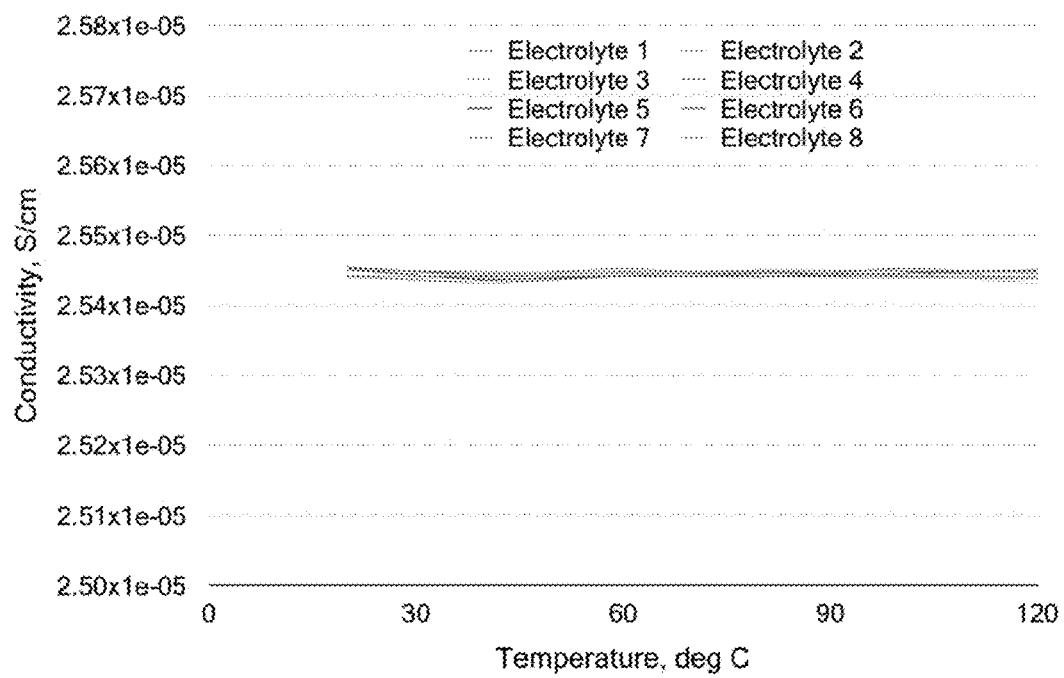
FIG. 8 is a graph showing the ionic conductivities of different example electrolytes.

The ionic conductivity of Electrolytes 1-8 were tested at 20° C., 40° C., 60° C., 80° C., 100° C. and 120° C., via a DC four probe complex impedance methodology used in order to separate other contributions. See Ohno, Hiroyuki, ed. Electrochemical aspects of ionic liquids. John Wiley & Sons (2011), which is hereby incorporated herein by reference in its entirety. Desirably, the ionic conductivity of the electrolyte does not vary considerably with temperature in order to maintain consistency of performance of ECW. FIG. 8 shows the ionic conductivity of the developed electrolytes over a range of temperature. It can be observed that the ionic conductivity of each electrolyte remains stable from 20° C. to 100° C. Without being bound by theory, this is attributed to the presence of coordinate bond between the lithium cations and nitrogen atoms in primary and secondary amines of the PEI.

Figure 9:
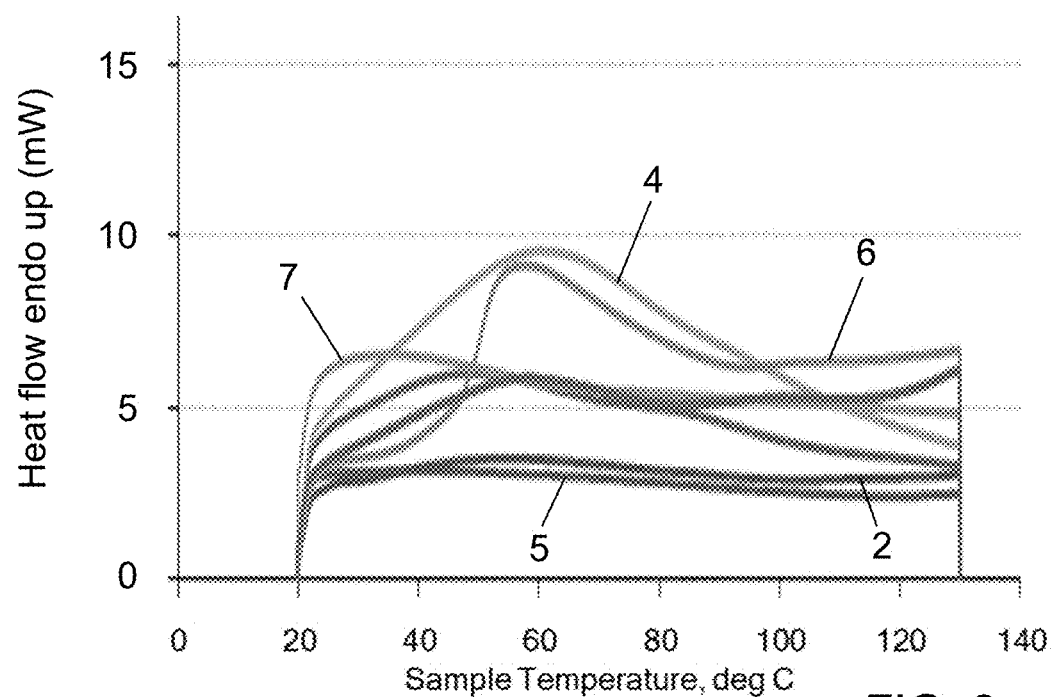
FIG. 9 is a graph of DSC data for different example electrolytes, in which certain traces are identified by electrolyte example number.

The chemical stability of the developed electrolytes were checked through Differential Scanning calorimetry(DSC) measurements. The DSC measurements were performed in the expected ECW operation temperature range from 20° C. to 130° C.,shown in FIG. 9, in which sample numbers are indicated for particular traces. The program was written to hold the sample at 20° C. for 2 minutes and increase the temperature by 5° C. per minute until the sample reached 130° C. and the sample was maintained at 130° C. for 30 minutes. In DSC measurements, the phase transformation of the sample is indicated by a narrow peak at the temperature at which the phase change occurs. From FIG. 8, it is observed that there are no obvious peaks in the operating temperature range. This implies that the sample does not undergo phase transformation which may lead to degradation of critical properties like mechanical stability, transmittance, viscosity and ionic conductivity. Therefore, it is concluded that the DSC measurements confirm the stability of the electrolyte in the operating temperature range.

Development of PEI-Based Electrolyte with Crosslinking Agent

Branched poly(ethyleneimine) (PEI), with number average molecular weight of 10,000 Da, was purchased from Sigma Aldrich. PEI was dried under vacuum at 70° C. for 24 hours to remove traces of water. Anhydrous DMSO, $LiClO_4$ (metal basis, 99.99%) and $LiCF_3SO_3$ were also purchased from Sigma Aldrich. $LiClO_4$ was dried under vacuum for 4 days before use to remove any traces of water. The compositions of Electrolytes 9-16 are provided in Table 2, below. For each, a solution of PEI and DMSO were first prepared according to the weight ratio from Table 2. The solution was allowed to stir for 5 hours. To this solution lithium salt (perchlorate or triflate) was added and allowed to stir for 3 hours. The crosslinking agent Bisphenol A diglycidyl ether (DGEBA) was added to the electrolyte in varying amounts, as shown in Table 2.

TABLE 2

| Electrolyte No. | Weight Ratio PEI/DMSO/DGEBA/$LiClO_4$(*) or $LiCF_3SO_3$(**) |
|---|---|
| 9 | 100/114.5/4.16/12.1** |
| 10 | 50/44/0.8/1.5* |
| 11 | 50/44/1.02/1.5 |
| 12 | 50/55/2.00/1.50 |
| 13 | 50/55/4.00/1.50 |
| 14 | 50/55/5.00/1.50 |
| 15 | 50/55/6.00/1.50 |
| 16 | 50/55/7.00/1.50 |

The electrolyte was allowed to cross link for 24 hours before use. The concentration of DGEBA was varied to measure its effect on the transmittance and ionic conductivity of the electrolyte.

Random crosslinking of PEI in solution is an attractive and economical processing strategy to produce rubber-like electrolytes. The addition of crosslinking agent to the electrolyte makes the electrolyte more viscous. For industrial purposes, solid state electrolytes with roll on mass production capability would be preferable; the person of ordinary skill in the art can provide the desired amount of crosslinking agent to provide the desired material rheology for such applications. Adding a crosslinking agent to the electrolyte opens up a wide range of possibilities to alter the viscosity and the thermal stability of the electrolyte. When DGEBA is added to PEI, a standard epoxide-amine reaction takes place This crosslinking reaction improves the thermal stability of the electrolyte.

Figure 10:
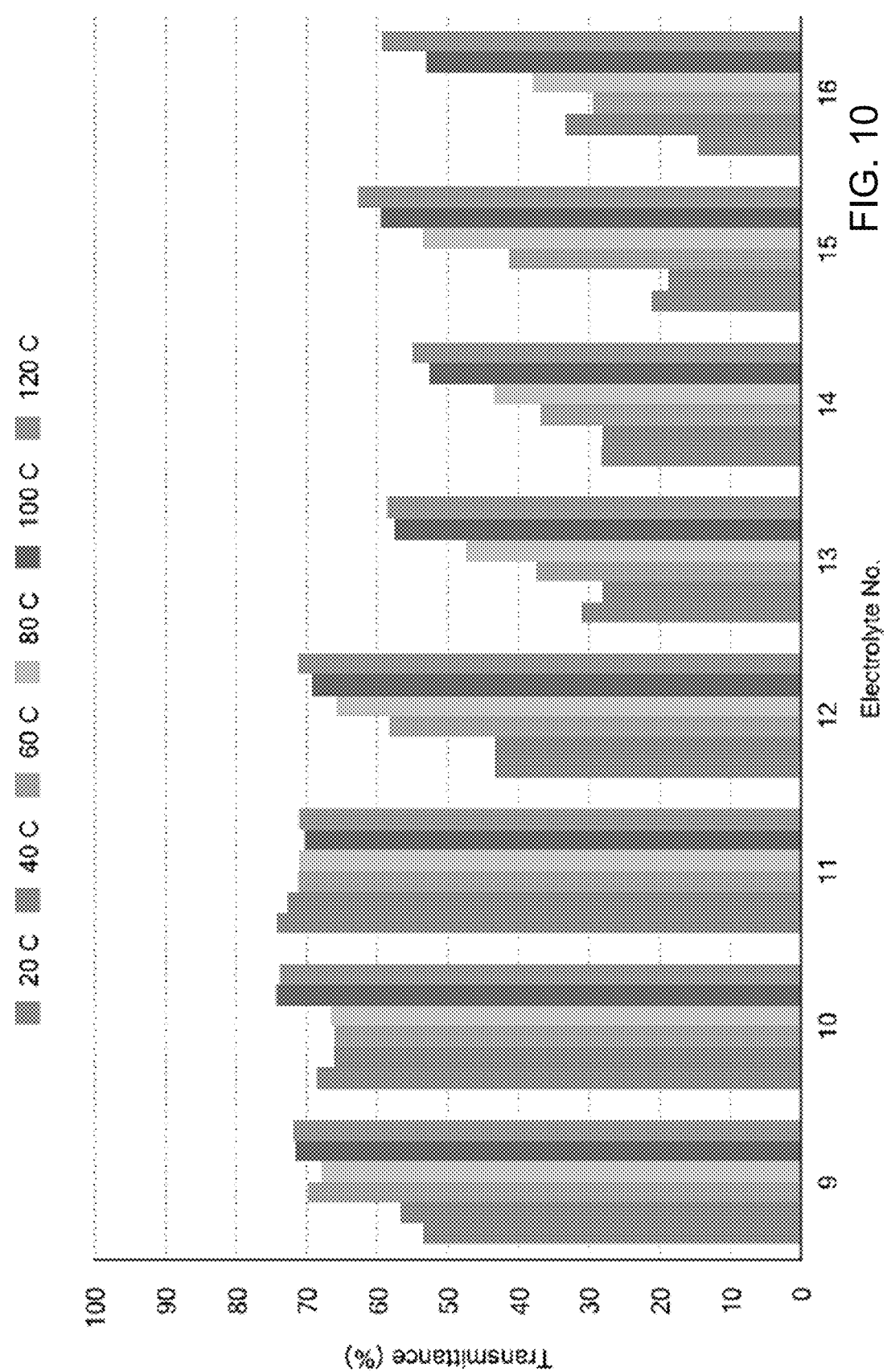
FIG. 10 is graph showing the transmittances of different example electrolytes at different temperatures, in which each set of bars is, from left to right, 20° C., 40° C., 60° C., 80° C., 100° C. and 120° C.

The electrolytes were sandwiched between two bare ITO glass substrates(38 mm×38 mm) with a Parafilm spacer. The sample was sealed with high temperature resistant epoxy adhesive. Electrolytes 9-16 were tested at different temperatures as described above; results are shown in FIG. 10. As the concentration of DGEBA is increased in the electrolyte the transmittance at room temperature decreases. When the amount of DGEBA added to solution was doubled compared to Electrolyte no. 1 the transmittance dropped to 40% from 70%. When the temperature of the sample increases the transmittance of Electrolytes 10 and 11 remain almost constant whereas for Electrolytes 12, 13, 15 and 16 the transmittance increases. The increase in transmittance for Electrolytes 12, 13, 14, 15 and 16 can be attributed to the reduction in viscosity of the electrolyte and possibly breaking of a few epoxide-amine bonds that make the electrolyte quite similar to Electrolytes 9 to 16. From these set of electrolytes, Electrolyte no. 11 is especially desirable because the transmittance of the electrolyte is consistently above 70%.

Figure 11:
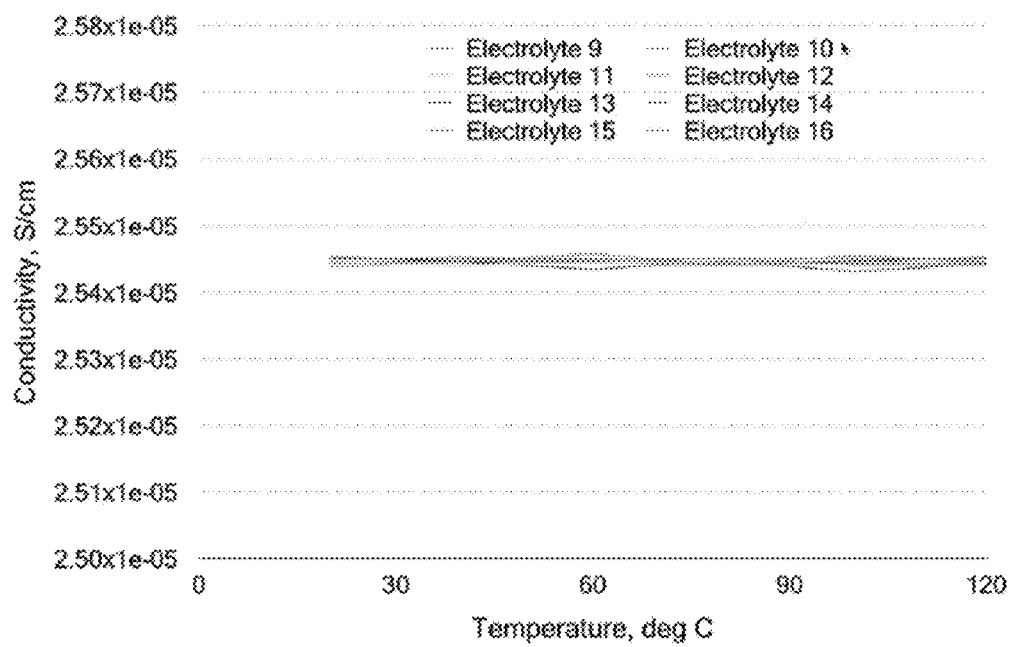
FIG. 11 is a graph showing the ionic conductivities of different example electrolytes.

The ionic conductivity of these electrolytes were tested at various temperatures as described above; results are provided in FIG. 11 Here, too, the ionic conductivity of the electrolyte remains stable from 20° C. to 120° C. For all concentrations of DGEBA tested, the ionic conductivity remains the same. This indicates that the lithium ion movement is not affected by the formation of epoxide-amine bonds. This is also improves that the ionic conductivity depends more chiefly on the solvent and not the nature of the crosslinking agent present in the electrolyte.

DSC measurements indicated that Electrolytes 9-16 were stable to chemical decomposition and phase change over the 20-130° C. temperature range.

Heat Resistant Electrochromic Windows

ECWs were fabricated by electropolymerization of ProDOT-$Me_2$ monomer on ITO-coated glass as a working electrode, $V_2O_5$_$TiO_2$ composite materials on ITO-coated glass as a counterelectrode and the developed electrolytes were sandwiched between the working and the counterelectrode. Each ECW was sealed using high temperature resistant epoxy adhesive and allowed to cure for 24 hours before use.

An ECW desirably has reasonable optical contrast before and after heat treatment. The transmittance change of the ECW was measured using the time course measurement technique in a JASCO spectrophotometer at a wavelength of 580 nm. From spectroscopy measurements, it is known that the ECW has the highest contrast ratio at 580 nm. Therefore, the time course measurements are performed at 580 nm.

The ECWs were made and tested at room temperature first. Heat treatment testing of ECW was carried out by exposing the ECW to 80° C. for 4 days using an environment chamber. The ECW was also tested at 120° C. for 30 minutes since the ECWs are to be laminated before selling. The ECWs are desirably capable of withstanding high temperature of 120° C. for 30 minutes.

For the Electrolytes 1 and 2 containing lithium triflate as the lithium salt, the ECW did not exhibit any measurable color change. This may be attributed to the bulky size of the triflate, which may not intercalate completely into the PProDOT-$Me_2$ film. To address this issue, a lithium salt with smaller anions, $LiClO_4$, was used instead. ECWs with electrolytes containing $LiClO_4$ as the lithium salt, there was a visible change in optical contrast.

The lower the PEI/DMSO weight ratio the lower is the viscosity of the electrolyte. In the electrolyte system PEI acts as the gelation agent and swells in DMSO. Therefore, when DMSO is added to the electrolyte the viscosity of the electrolyte becomes lower. When the low viscosity electrolytes are sandwiched between the working and counter electrodes in an ECW they have a tendency to flow out or move away from the center of the ECW. This was observed from the measurements of windows based on Electrolytes 3-5; the contrast be-tween the opaque and the transparent states is high in the firrst cycle but drastically decreases in the second and third cycles. This can be attributed to the movement of electrolyte away from the center. Since there is minimal electrolyte present in the center the color switching of the PPRODOT-Me2 film was negligible in later cycles.

Figure 12A:
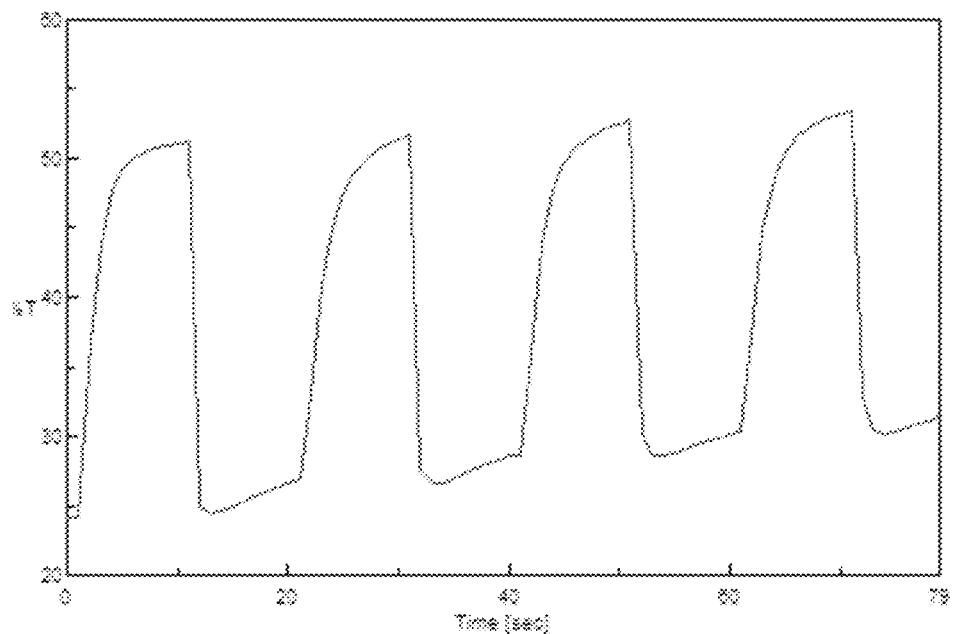
FIGS. 12A and 12B are graphs depicting the time course measurements of ECWs with Electrolyte 8, before (12A) and after (12B) heat treatment at 80° C.
Figure 12B:
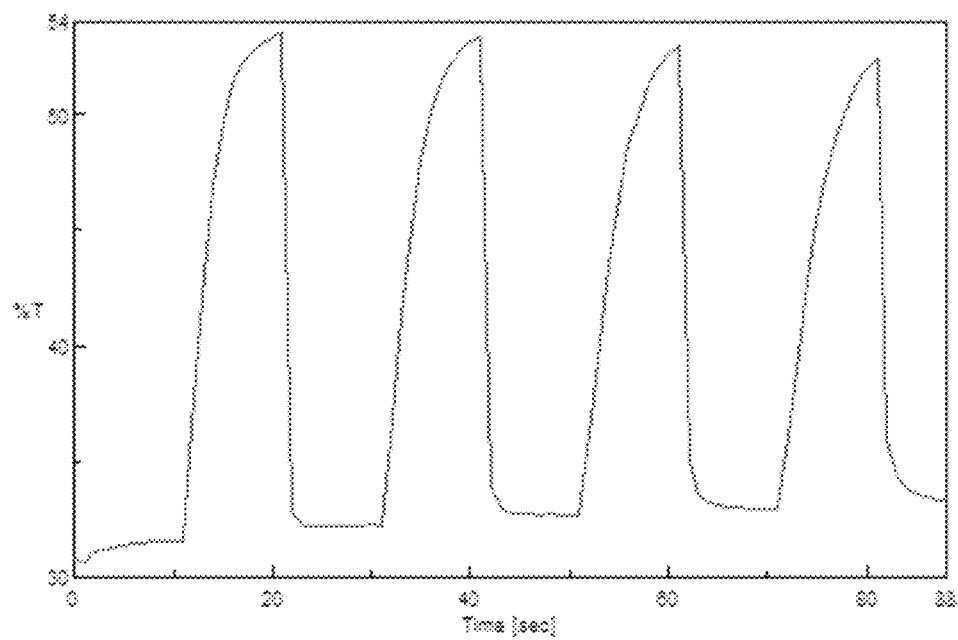

In this study, this issue was addressed by increasing the viscosity of the electrolyte by a) decreasing the concentration of solvent (DMSO); and/or b) crosslinking the PEI film to form a more gel-like material. In Electrolytes 6,7 and 8 the concentration of the DMSO was decreased in order to increase the viscosity of the electrolyte material and to modulate the number of free lithium ions present as free ions since higher the concentration of lithium salt lower is the concentration of free lithium ions due to the formation of contact ion pairs or triple ions. FIGS. 12A and 12B show the time course measurements of ECWs with Electrolyte 8, before (12A) and after (12B) heat treatment at 80° C.

Figure 13A:
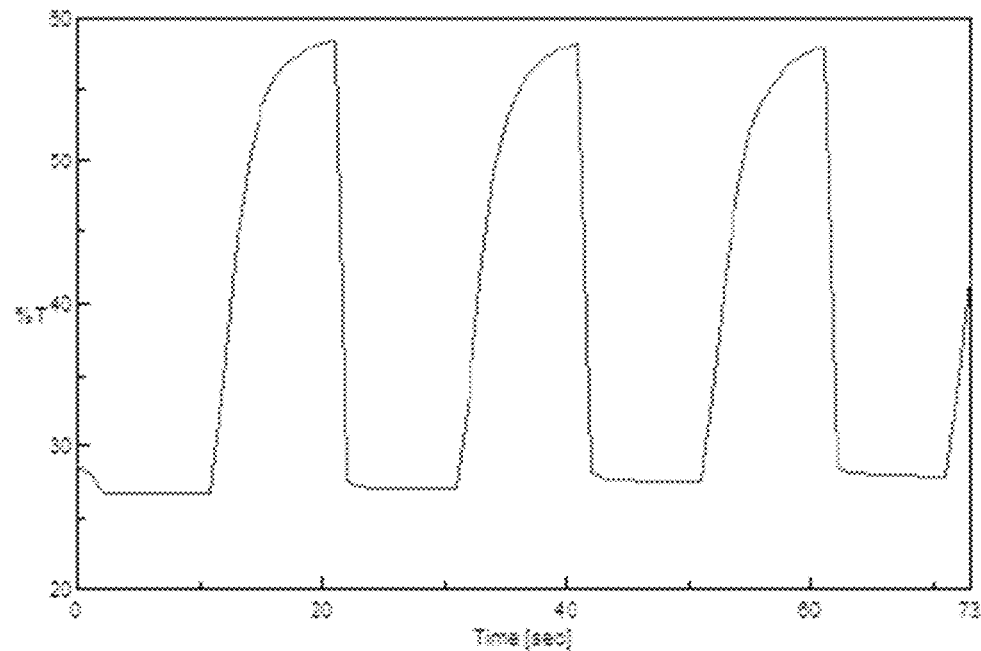
FIGS. 13A and 13B are graphs depicting the time course measurements of ECWs with Electrolyte 10, before (13A) and after (13B) heat treatment at 80° C.
Figure 13B:
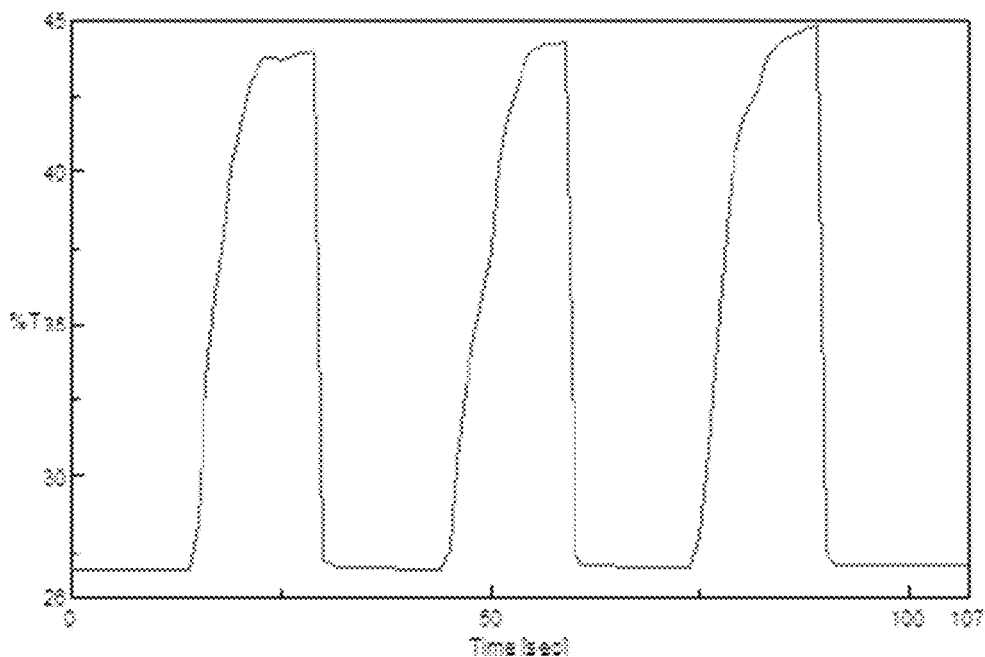
Figure 14A:
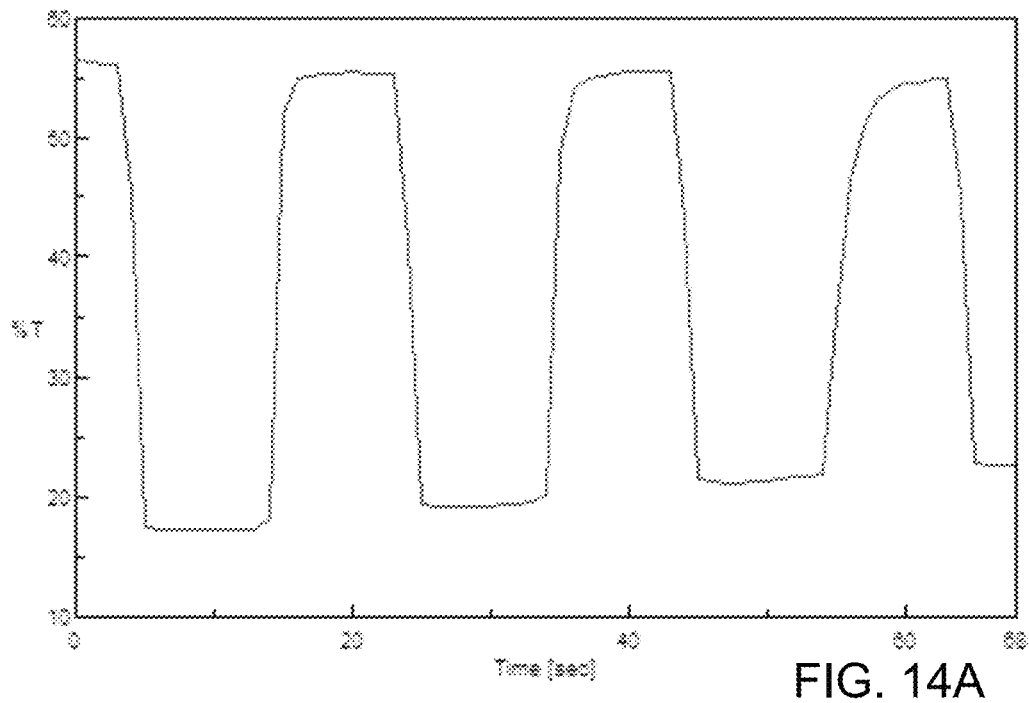
FIGS. 14A and 14B are graphs depicting the time course measurements of ECWs with Electrolyte 11, before (14A) and after (14B) heat treatment at 80° C.
Figure 14B:
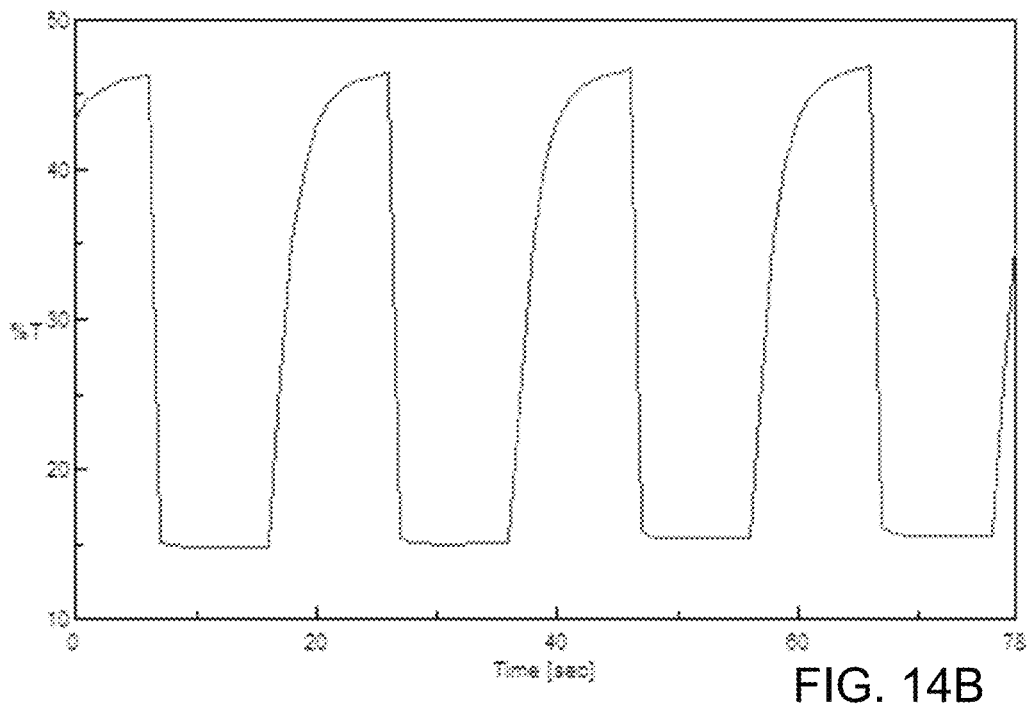

FIGS. 13A and 13B provide time course measurements for the optical transmittance of ECW with Electrolyte no 10, before (13A) and after (13B) heat treatment at 80° C. FIGS. 14A and 14B provide time course measurements for the optical transmittance of ECW with Electrolyte no 11, before (14A) and after (14B) heat treatment at 80° C. The ECW with Electrolyte 11 shows reasonable contrast ratio and stability. But ECWs with Electrolyte 10 exhibit better stability over time. The person of ordinary skill in the art can use these electrolytes as examples in designing further electrolytes of the disclosure.

Experiments are also described as follows: Initial molar amount of the developed electrolyte was lithium triflate ($LiCF_3SO_3$) between 3.87 mmoles to 1.15 mmoles, PEI between 1 mmoles to 1.3 mmoles, DGEBA between 0-1.22 mmoles in 0.14 moles of dimethyl sulfoxide as the solvent. ECWs made with these electrolytes did not show any measurable changes in optical contrast. Without intending to be bound by theory, the inventors surmise that contain $LiCF_3SO_3$ as the lithium salt which has a bulky triflate ion, and the PEI matrix may hinder the movement of bulky anion. To address this issue, $LiCF_3SO_3$ was replaced by lithium perchlorate ($LiClO_4$) keeping the molar concentrations of PEI and DMSO constant. The molar amount of $LiClO_4$ was between 1.41-5 mmoles. The developed electrolyte was less viscous and had a tendency to flow away from the center in the ECW when sandwiched between the working and counter electrode. This resulted in the electrochromic material not being completely reduced and oxidized which leads to unstable optical contrast. This indicated that the viscosity of the electrolyte should be increased to enhance the performance of ECW. The viscosity of the electrolyte was reduced in two ways, by reducing the solvent concentration, and/or by introducing crosslinking agents like diglycidyl ether of bisphenol A (DGEBA). The amount of DMSO was halved in the next electrolytes to prevent electrolyte from flowing away from the center. The molar amount of $LiClO_4$ was maintained between 1.41-2.81 mmoles. This modification resulted in reasonable improvement in stability of optical contrast. It was also noted that in ECWs with electrolytes containing higher salt concentration the optical contrast is lower. Without being bound by theory, the inventors attribute this to the reduction in concentration of free $Li^+$ available for conduction at high salt concentration due to the formation of contact ion pairs or triple ions. In order to make the electrolyte thermally stable at 120° C., DGEBA crosslinking agent was introduced. DGEBA and PEI form epoxide-imine crosslinks which provides the electrolyte better thermal stability. The epoxide-imine matrix does not favor the movement of cations and anions in the electrolyte which may reduce the ionic conductivity of the electrolyte. If $Li^+$ do not move freely in the electrolyte, the optical contrast of the ECW may be lost. Therefore, it is important to optimize the amount of DGEBA added to the electrolyte. Particularly preferred electrolytes contains polyethylene imine(PEI), Lithium perchlorate($LiClO_4$) and diglycidyl ether of bisphenol A(DGEBA) with dimethyl sulfoxide(DMSO) as the solvent, where the relative amounts are: $LiClO_4$ between 1.12-1.69 mmoles, PEI between 0.5-0.65 mmoles and of DGEBA is 0-0.24 mmoles. The molar ratio with respect to the solvent for $LiClO_4$ is between 0.016-0.024, PEI is between 0.007-0.0092 and for DGEBA is between 0-0.003. The electrolytes developed with this composition showed good optical contrast before and after heat treatment.

We claim:

1. An electrolyte material comprising:
   a polymer of ethyleneimine;
   a lithium salt; and
   a high-boiling solvent,
   the electrolyte material having a % transmittance at 580 nm of at least about 50% per 100 μm thickness at 40° C.

2. The electrolyte material according to claim 1, wherein the polymer of ethyleneimine has a molecular weight in the range of about 1000 g/mol to about 100,000 g/mol.

3. The electrolyte material according to claim 1, wherein the polymer of ethylene imine is present in the electrolyte material in an amount in the range of about 35 wt % to about 65 wt %.

4. The electrolyte material according to claim 1, wherein the polymer of ethyleneimine has at least about 80 wt % ethyleneimine subunits.

5. The electrolyte material according to claim 1, wherein the polymer of ethyleneimine is poly(ethyleneimine).

6. The electrolyte material according to claim 1, wherein the polymer of ethyleneimine is not crosslinked.

7. The electrolyte material according to claim 6, further comprising an unreacted polyfunctional epoxide crosslinker.

8. The electrolyte material according to claim 1, wherein the polymer of ethyleneimine is at least partially crosslinked.

9. The electrolyte material according to claim 8, wherein the polymer of ethyleneimine is at least partially crosslinked with residues derived from a polyfunctional epoxide crosslinker
   present in the electrolyte material in an amount up to about 4 wt %.

10. The electrolyte material according to claim 1, wherein the lithium salt is lithium perchlorate.

11. The electrolyte material according to claim 1, wherein the lithium salt is present in the electrolyte material in an amount in the range of about 0.2 wt % to about 5 wt %.

12. The electrolyte material according to claim 1, wherein the high-boiling solvent is DMSO.

13. The electrolyte material according to claim 1, wherein the high-boiling solvent is present in an amount in the range of about 20 wt % to about 64 wt %.

14. The electrolyte material according to claim 1, wherein the sum of the amounts of the high-boiling solvent, the polymer of ethyleneimine, the lithium salt and any crosslinker or crosslinking residues is at least about 80 wt % of the electrolyte material.

15. The electrolye material according to claim 1, comprising:
  the polymer of ethyleneimine is present in an amount of about 35 to about 65 wt %;
  the lithium salt is present in an amount of about 0.2 to about 5 wt %; and
  the high-boiling solvent is present in an amount of about 20 to about 64 wt % of a high-boiling solvent.

16. An electrochromic device comprising
  an electrochromic material;
  a counterelectrode; and
  the electrolyte material according to claim 1 disposed between the electrochromic material and the counterelectrode,
  the counterelectrode being capable of electrochemically reversibly absorbing lithium ions from the electrolyte and releasing lithium ions into the electrolyte.

17. The electrochromic device according to claim 16, wherein the electrochromic material, the counterelectrode and the electrolyte material are disposed between two bodies of transparent media.

18. The electrochromic device according to claim 17, further comprising a voltage source operatively coupled to the electrochromic material and the counterelectrode.

19. The electrochromic device according to claim 18, configured as an automobile.

* * * * *